United States Patent
Li et al.

(10) Patent No.: US 12,340,620 B2
(45) Date of Patent: Jun. 24, 2025

(54) OFF-SCREEN DISPLAY CONTROL METHOD, ELECTRONIC DEVICE, AND STORAGE MEDIUM

(71) Applicant: Honor Device Co., Ltd., Shenzhen (CN)

(72) Inventors: Jingwei Li, Shenzhen (CN); Yufeng Che, Shenzhen (CN); Qian Gao, Shenzhen (CN); Libo Huang, Shenzhen (CN); Wenhan Huang, Shenzhen (CN); Chao Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/259,313

(22) PCT Filed: Dec. 14, 2022

(86) PCT No.: PCT/CN2022/138959
§ 371 (c)(1),
(2) Date: Jun. 26, 2023

(87) PCT Pub. No.: WO2023/130929
PCT Pub. Date: Jul. 13, 2023

(65) Prior Publication Data
US 2024/0386745 A1    Nov. 21, 2024

(30) Foreign Application Priority Data
Jan. 10, 2022   (CN) .......................... 202210020948.8

(51) Int. Cl.
*G06V 40/16*    (2022.01)
*G06F 1/3231*    (2019.01)
(Continued)

(52) U.S. Cl.
CPC .......... *G06V 40/161* (2022.01); *G06F 1/3231* (2013.01); *G06F 1/3265* (2013.01); *G06F 3/14* (2013.01)

(58) Field of Classification Search
CPC ........ G06F 3/14; G06F 1/3265; G06F 1/3231; G06V 40/161
See application file for complete search history.

(56) References Cited

U.S. PATENT DOCUMENTS

| | | |
|---|---|---|
| 2018/0367656 A1 | 12/2018 | Kim et al. |
| 2021/0065660 A1 | 3/2021 | Zhong et al. |
| 2022/0283610 A1 | 9/2022 | Ran |

FOREIGN PATENT DOCUMENTS

| | | |
|---|---|---|
| CN | 103957327 A | 7/2014 |
| CN | 108337363 A | 7/2018 |

(Continued)

*Primary Examiner* — Abbas I Abdulselam
(74) *Attorney, Agent, or Firm* — Conley Rose, P.C.

(57) ABSTRACT

An off-screen display control method, an electronic device, and a computer-readable storage medium. The off-screen display control method includes: enabling a face detection function when a display screen of an electronic device is in an off-screen state and obtaining image data through a front camera; determining, by the electronic device, that the image data includes a part or the entire of a face image, and displaying an off-screen display interface on the display screen; and determining, by the electronic device, that the image data does not include a part or the entire of a face image, and maintaining the off-screen state on the display screen.

20 Claims, 19 Drawing Sheets

(51) Int. Cl.
*G06F 1/3234* (2019.01)
*G06F 3/14* (2006.01)

(56) References Cited

FOREIGN PATENT DOCUMENTS

| | | |
|---|---|---|
| CN | 108418953 A | 8/2018 |
| CN | 109557999 A | 4/2019 |
| CN | 110516515 A | 11/2019 |
| CN | 110658906 A | 1/2020 |
| CN | 111327888 A | 6/2020 |
| CN | 112671976 A | 4/2021 |
| JP | 2013062777 A | 4/2013 |

CONT. FROM FIG. 4B

CONT. FROM FIG. 4C

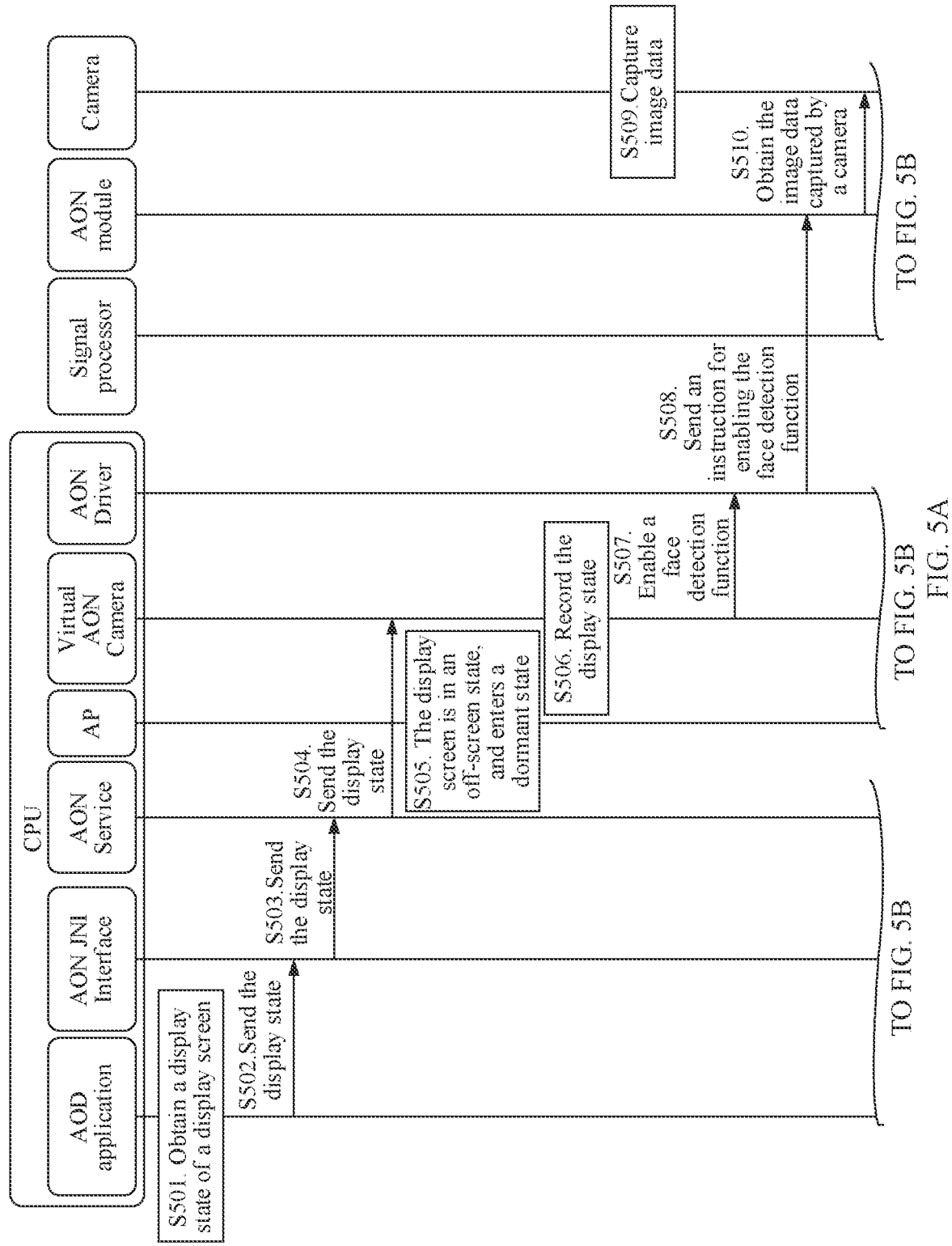

S710. Determine, based on the three-axis detection data, whether the electronic device is not in a first posture, determine whether the ambient light brightness is not less than a first threshold, and determine whether a departing event is received S711. Enable a face detection function S712. Determine whether the face detection function is enabled S713. Send indication information to indicate that a face detection function of an electronic device is enabled

CONT. FROM FIG. 7A

FIG. 7B

OFF-SCREEN DISPLAY CONTROL METHOD, ELECTRONIC DEVICE, AND STORAGE MEDIUM

CROSS-REFERENCE TO RELATED APPLICATIONS

This application is a U.S. National Stage of International Application No. PCT/CN2022/138959 filed on Dec. 14, 2022, which claims priority to Chinese Patent Application No. 202210020948.8, filed with the China National Intellectual Property Administration on Jan. 10, 2022, both of which are incorporated herein by reference in their entireties.

TECHNICAL FIELD

The present application relates to the field of display technologies, and in particular, to an off-screen display control method, an electronic device, and a computer-readable storage medium.

BACKGROUND

Off-screen display is a display function when an electronic device is in an off-screen state. Compared with conventional display, power consumption of off-screen display is lower, and users may obtain information such as dates, times, and reminders. FIG. 1A provides an off-screen display interface of an electronic device, and a user can know a date and a time through the off-screen display interface.

A startup method of the off-screen display provided by the electronic device is: The electronic device is in an off-screen state, a user touches the display screen, and the electronic device displays the off-screen display interface. However, if it is inconvenient for the user to touch the display screen, the electronic device cannot display the off-screen display interface.

SUMMARY

The present application provides an off-screen display control method, an electronic device, and a computer-readable storage medium, to conveniently trigger the electronic device to display an off-screen display interface.

To achieve the foregoing objective, the present application provides the following technical solutions.

According to a first aspect, the present application provides an off-screen display control method applied to an electronic device, including: enabling, by the electronic device, a face detection function when a display screen of an electronic device is in an off-screen state and obtaining image data through a front camera; determining, by the electronic device, that the image data includes a part or the entire of a face image, and displaying an off-screen display interface on the display screen of the electronic device; and determining, by the electronic device, that the image data does not include a part or the entire of the face image, and maintaining the off-screen state on the display screen of the electronic device.

It can be seen from the above content that, when the display screen is in the off-screen state, the electronic device enables the face detection function. After the face detection function is enabled, the electronic device may obtain the image data through the front camera, and when it is determined that the image data includes a part or the entire of a face image, the display screen displays the off-screen display interface, thus realizing a convenient trigger manner in which when the display screen of the electronic device is in the off-screen state, a face approaches to the display screen to trigger the electronic device to display the off-screen display interface.

In a possible implementation, a processor of the electronic device includes an intelligent sensor hub sensor hub, and the sensor hub includes: an AON module; and the enabling, by the electronic device, a face detection function includes: starting, by the electronic device, the AON module to perform the face detection function.

In a possible implementation, the AON module includes: an image signal processor ISP and a face detection module, and the starting, by the electronic device, the AON module to perform the face detection function includes: controlling, by the electronic device, the ISP to output image data, and controlling the face detection module to perform face detection on the image data.

In a possible implementation, the processor of the electronic device includes: a virtual AON camera Virtual AON Camera; and the enabling, by the electronic device, a face detection function when a display screen of an electronic device is in an off-screen state includes: enabling the face detection function when the virtual AON camera determines that the display screen is in the off-screen state.

In this possible implementation, the display screen is in the off-screen state, and the AP of the processor of the electronic device is dormant. Therefore, the processor of the electronic device includes a virtual AON camera Virtual AON Camera, and the face detection function is enabled by the Virtual AON Camera.

In a possible implementation, before the enabling the face detection function when the virtual AON camera determines that the display screen is in the off-screen state, the method further includes: receiving, by the Virtual AON Camera, an off-screen state of the display screen and recording the off-screen state of the display screen.

In this possible implementation, since the Virtual AON Camera takes over enabling/disabling of the face detection function, the display state of the display screen needs to be known. Considering that when the display screen is in the off-screen state, the AP becomes dormant, before the AP becomes dormant, the Virtual AON Camera receives the off-screen state of the display screen and records the off-screen state of the display screen.

In a possible implementation, after the enabling the face detection function when the virtual AON camera determines that the display screen is in the off-screen state, the method further includes: when the Virtual AON Camera determines that the image data includes a part or the entire of image data, waking up the application processor of the electronic device, and sending the off-screen state of the display screen to the application processor.

In this possible implementation, since displaying the off-screen display interface on the display screen of the electronic device needs to rely on that the application processor AP is in the wake-up state, when determining that the image data includes a part or the entire of the image data, the Virtual AON Camera needs to first wake up the AP. Because the display state of the display screen is recorded by the Virtual AON Camera when the AP is dormant, after the AP wakes up, the Virtual AON Camera sends the display state of the display screen recorded by itself to the AP to ensure the normal operation of the AR.

In a possible implementation, after the determining, by the electronic device, that the image data includes a part or the entire of a face image, and displaying an off-screen display interface on the display screen of the electronic device, the method further includes: when the electronic device determines that the display screen is in a non-off-screen state, disabling the face detection function.

In this possible implementation, if the face detection function of the electronic device is enabled when the display screen is in the non-off-screen state, this affects the normal usage of the electronic device. Therefore, the face detection function needs to be disabled.

In a possible implementation, the disabling the face detection function when the electronic device determines that the display screen is in a non-off-screen state includes: when the application processor of the electronic device determines that the display screen is in the non-off-screen state, disabling the face detection function.

In a possible implementation, before the disabling, by the application processor of the electronic device, the face detection function, the method further includes: receiving, by the application processor, indication information sent by the virtual AON camera Virtual AON Camera, where the indication information is used to indicate that the face detection function is in an enabled state.

In a possible implementation, the disabling the face detection function when the electronic device determines that the display screen is in a non-off-screen state includes: when the electronic device determines that the display screen is in the non-off-screen state, controlling the AON module to disable the face detection function.

In a possible implementation, the determining, by the electronic device, that the image data includes a part or the entire of a face image includes: determining, by the electronic device, that the AON module obtains a face detection event.

In a possible implementation, the electronic device includes an AOD application, and the determining, by the electronic device, that the image data includes a part or the entire of a face image, and displaying an off-screen display interface on the display screen of the electronic device includes: determining, by the AOD application, that the image data includes a part or the entire of a face image, and controlling the display screen to display the off-screen display interface.

In a possible implementation, before the enabling, by the electronic device, a face detection function when a display screen of an electronic device is in an off-screen state, the method further includes: determining, by the electronic device, that a face is recognized and an off-screen display function is enabled.

It can be seen from this possible implementation that: When the face appears before the display screen, the function of displaying the off-screen display interface is triggered. The electronic device is equipped with two enabling switches. One enabling switch is a switch for the off-screen display function when it is recognized that the face appears, and is provided for manual triggering by the user. The other enabling switch is a switch for enabling the face detection function when the display screen of the electronic device is in the off-screen state. After the two enabling switches equipped on the electronic device are both activated, the electronic device may detect that a face appears before the display screen, and trigger the display of the off-screen display interface.

In a possible implementation, before the displaying an off-screen display interface on the display screen of the electronic device, the method further includes: determining, by the electronic device, that the image data includes a specified feature, where the specified feature is used to represent a face image of a legitimate user of the electronic device.

In a possible implementation, the determining, by the electronic device, that the image data includes a part or the entire of a face image includes: determining, by the electronic device, that a plurality of frames of image data include a part or the entire of the face image, where the plurality of frames of image data are obtained by the front camera within a preset time.

In a possible implementation, before the enabling, by the electronic device, a face detection function, the method further includes: determining, by the electronic device, that the electronic device satisfies a preset condition: where the preset condition includes that the display screen of the electronic device is not in a downward posture, the brightness of an environment where the electronic device is located is not less than a first threshold, and the electronic device detects no object that approaches.

In this possible implementation, when the electronic device determines that the display screen of the electronic device is not in the downward posture, determines that the ambient light brightness is not less than the first threshold, and further determines that a departing event is received, it indicates that the display screen of the electronic device is in the upward posture, in an environment with sufficient brightness, and has no object that approaches, the face detection function may be enabled to avoid the waste of power caused by enabling of the face detection function when the electronic device is not in the upward posture, or in the environment with insufficient brightness, or is blocked by an object.

In a possible implementation, before the displaying an off-screen display interface on the display screen of the electronic device, the method further includes: determining, by the electronic device, that a difference between a time when it is currently recognized that the image data includes a part or the entire of the face image and a time when it is previously recognized that the image data includes a part or the entire of the face image is not less than a threshold.

In this possible implementation, when the electronic device determines that the difference between the time when it is currently recognized that the image data includes a part or the entire of the face image and the time when it is previously recognized that the image data includes a part or the entire of the face image is not less than the threshold, the display screen displays the off-screen display interface, so that the electronic device may be prevented from entering an infinite cycle of "a face is detected→the off-screen display interface is displayed→after a period of time, the off-screen display interface disappears→a face is detected".

In a possible implementation, the determining, by the electronic device, that a difference between a time when it is currently recognized that the image data includes a part or the entire of the face image and a time when it is previously recognized that the image data includes a part or the entire of the face image is not less than a threshold includes: determining, by the electronic device, that a difference between a reporting time of the face detection event and a reporting time of a previous face detection event is not less than a threshold, where the face detection event is generated by the electronic device by recognizing that the image data includes a part or the entire of the face image.

According to a second aspect, the present application provides an electronic device, including: one or more processors, a memory, a display screen, and a front camera. The memory, the display screen, and the front camera are coupled to the one or more processors, the memory is configured to store computer program code, the computer program code includes computer instructions, and when the one or more processors execute the computer instructions, the electronic device performs the off-screen display control method according to any one of the implementations of the first aspect.

According to a third aspect, the present application provides a computer storage medium, configured to store a computer program. When the computer program is executed, the off-screen display control method according to any one of the implementations of the first aspect is specifically implemented.

According to a fourth aspect, the present application provides a computer program product. The computer program product, when running on a computer, causes the computer to perform the off-screen display control method according to any one of the implementations of the first aspect.

BRIEF DESCRIPTION OF DRAWINGS

FIG. 5A and FIG. 5B are a signaling diagram of an off-screen display control method according to Embodiment 1 of the present application;

FIG. 7A and FIG. 7B are a signaling diagram of an off-screen display control method according to Embodiment 3 of the present application.

DESCRIPTION OF EMBODIMENTS

Figure 1A:
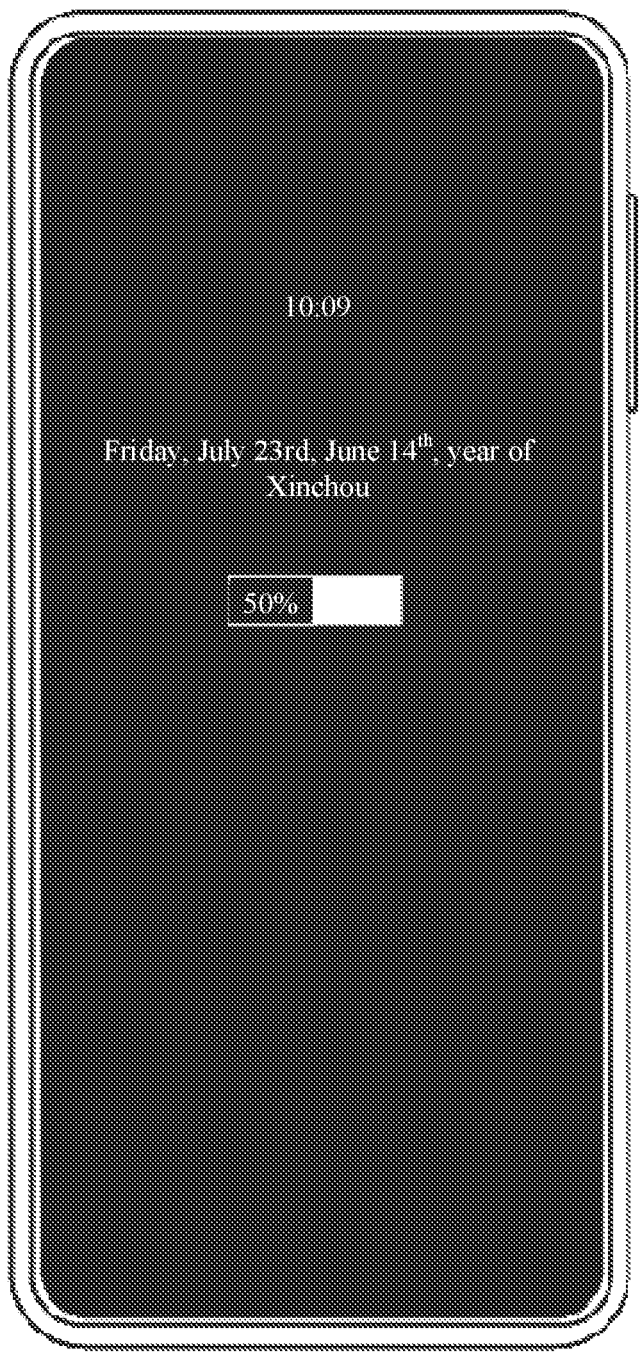
FIG. 1A is a display diagram of an off-screen display interface.

The following clearly and completely describes technical solutions in embodiments of the present application with reference to the accompanying drawings in the embodiments of the present application. Terms used in the following embodiments are only intended to describe particular embodiments, and are not intended to limit the present application. As used in this specification and the claims of the present application, a singular expression form, "one", "a", "the", "foregoing", "the", or "this", is intended to also include "one or more" expression form, unless clearly indicated to the contrary in the context. It should be further understood that, in the embodiments of the present application, "one or more" means one, two, or more. "and/or" describes an association relationship between associated objects and represents that three relationships may exist, for example, A and/or B may mean: only A exists, both A and B exist, and only B exists, where A and B may be singular or plural. The character "/" generally indicates that associated objects are in an "or" relationship.

Reference to "one embodiment" or "some embodiments" described in this specification means that a specific characteristic, structure or feature described in combination with this embodiment is included in one or more embodiments of the present application. Therefore, the statements "in one embodiment", "in some embodiments". "in other embodiments", "in some other embodiments", and the like in the differences in this specification do not necessarily refer to the same embodiment, but mean "one or more but not all embodiments", unless otherwise specially emphasized in other ways. The terms "include", "contain", "have" and their variations mean "including but not limited to", unless otherwise specially emphasized in other ways.

A plurality of involved in the embodiments of the present application refers to two or more. It should be noted that in descriptions of the embodiments of the present application, terms such as "first" and "second" are merely used for distinguishing descriptions, and cannot be understood as an indication or implication of relative importance, or an indication or implication of a sequence.

To more clearly clarify the technical solutions of the present application, the related concepts involved in the present application are explained below.

(1) An AOD (Always On Display, always on display) display interface is also known as an off-screen display interface, and is a display interface with low power consumption. The interface generally displays some messages to remind a user of a time, a date, mobile phone power, and the like. In addition, the interface may also display an animation effect, which is displayed synchronously with a message reminding a user.

(2) Frames per second (Frames Per Second) refer to: a speed at which a camera captures images.

At present, off-screen display is a display function when an electronic device is in an off-screen state. Compared with conventional display, power consumption of off-screen display is lower, and users may obtain information such as dates, times, and reminders. A startup method of the off-screen display provided by the electronic device is: The electronic device is in an off-screen state, a user touches the display screen, and the electronic device displays the off-screen display interface.

Figure 1B:
FIG. 1B is a diagram of an application scenario according to the present application.

However, if it is inconvenient for the user to touch the display screen, the electronic device cannot display an AOD display interface. In view of this problem, the embodiments of the present application propose an off-screen display control method, to implement that a face triggers an electronic device to display an AOD display interface when a display screen is in an off-screen state, as shown in FIG. 1B.

The off-screen display control method provided in the embodiments of the present application may be applied to an electronic device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, a smartwatch, and the like.

Figure 2A:
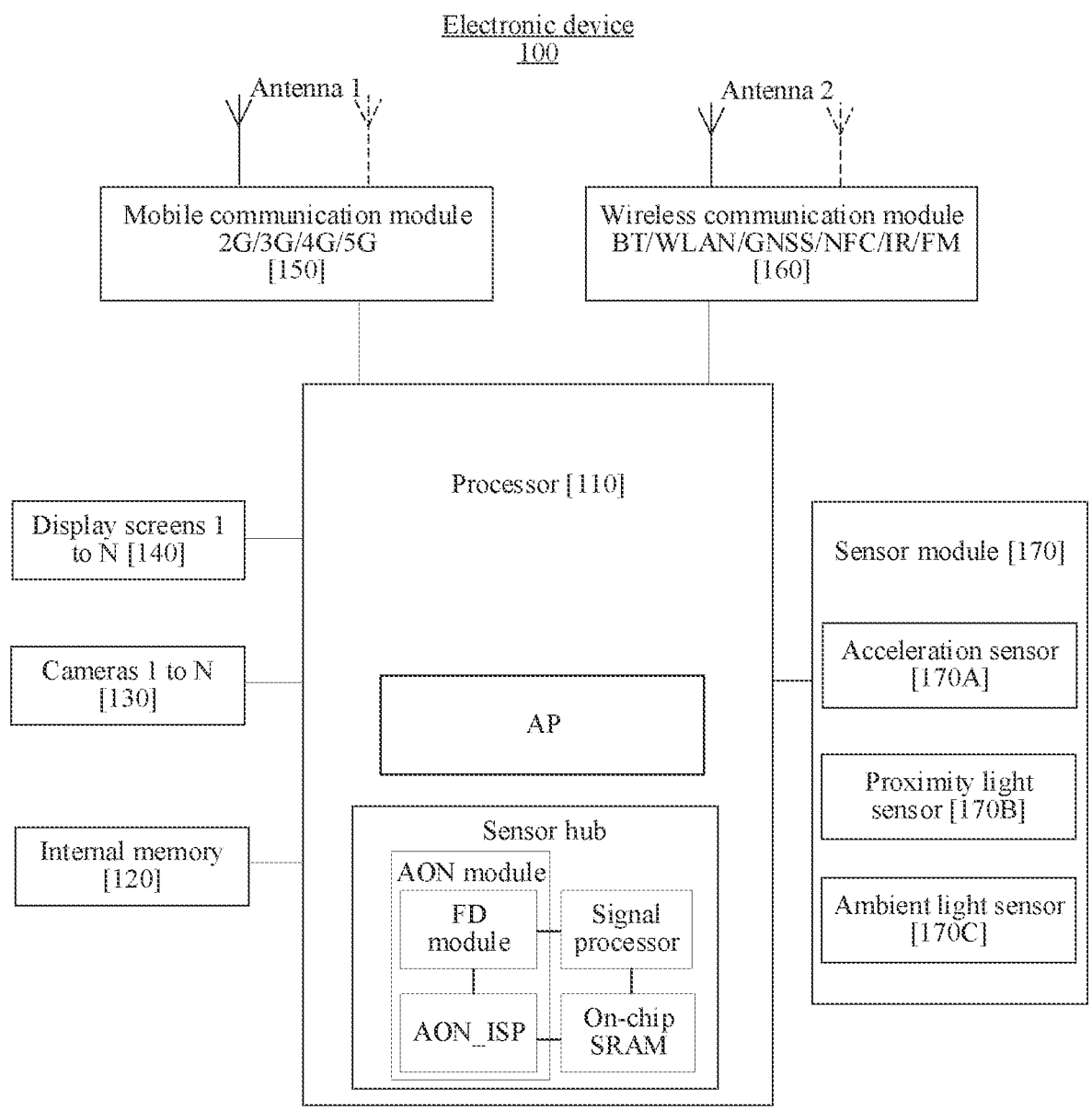
FIG. 2A is a diagram of a hardware structure of an electronic device according to the present application.

A mobile phone is used as an example. FIG. 2A illustrates a composition example of an electronic device according to an embodiment of the present application. As shown in FIG. 2A, an electronic device 100 may include a processor 110, an internal memory 120, a camera 130, a display screen 140, an antenna 1, an antenna 2, a mobile communication module 150, a wireless communication module 160, a sensor module 170, and the like. The sensor module 170 may include an acceleration sensor 170A, a proximity light sensor 170B, an ambient light sensor 170C, and the like.

It may be understood that the schematic structure in this embodiment constitutes no specific limitation on the electronic device 100. In some other embodiments, the electronic device 100 may include more or fewer components than those shown in the figure, or some components may be combined, or some components may be split, or components are arranged in different manners. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, an intelligent sensor hub (sensor hub), and/or a neural-network processing unit (neural-network processing unit, NPU). Different processing units may be separate devices, or may be integrated into one or more processors.

A memory may also be disposed in the processor 110, and is configured to store instructions and data. In some embodiments, the memory in processor 110 is a cache memory. The memory may store instructions or data recently used or cyclically used by the processor 110. If the processor 110 needs to use the instruction or the data again, the processor may directly call the instruction or the data from the memory, repeated access is avoided, and waiting time of the processor 110 is reduced, thereby improving system efficiency.

In some embodiments, the intelligent sensor hub (sensor hub) in the processor 110 may provide a solution of a combination of software and hardware based on an MCU with low power consumption and a lightweight RTOS operating system, and mainly functions to connect and process data from various sensor devices.

The sensor hub may include: an AON (Always on) module, a signal processor, and a memory (On-chip SRAM). The AON module is an independent module with low power consumption and includes; an AON_ISP and a face detection (Face Detect. FD) module. The AON_ISP can be understood as a Mini ISP and is configured to process data fed back by the camera 130. In some embodiments, the AON_ISP converts, into image data, an electrical signal converted by the photosensitive element of the camera. The FD module is configured to perform face detection on the image data output by the AON_ISP, to obtain a face detection event.

The signal processor can be understood as a sensor chip, such as an SSC (Snapdragon Sensing Core), and is configured to transmit the face detection event obtained by the FD module.

The on-chip SRAM is configured to store the image data obtained by the AON_ISP.

The internal memory 120 may be configured to store computer executable program code, where the executable program code includes an instruction. The processor 110 runs the instructions stored in the internal memory 120, to implement various functional applications and data processing of the electronic device 100. The internal memory 120 may include a program storage region and a data storage region. The program storage area may store an operating system, an application required by at least one function (such as a sound playback function and an image display function), and the like. The data storage region may store data (such as audio data and an address book) and the like created when the electronic device 100 is used. In addition, the internal memory 120 may include a high-speed random access memory, or may include a non-volatile memory such as at least one magnetic disk memory, a flash memory, or a universal flash storage (universal flash storage, UFS). The processor 110 runs the instructions stored in the internal memory 120 and/or the instructions stored in the memory disposed in the processor, to implement various functional applications and data processing of the electronic device 100.

The electronic device implements a display function through the GPU, the display screen 230, the application processor. The GPU is a microprocessor for image processing and connects the display 230 and the application processor. The GPU is configured to perform mathematical and geometric calculations, and is configured to render graphics. The processor 210 may include one or more GPUs, and execute program instructions to generate or change display information.

The display screen 230 is configured to display an image, a video, and the like. The display screen 230 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light-emitting diode (quantum dot light-emitting diodes, QLED), or the like. In some embodiments, the electronic device may include one or N display screens 230. N is a positive integer greater than 1.

The electronic device 100 may implement a photographing function by using the ISP, the camera 130, the video codec, the GPU, the display screen 140, the application processor, and the like.

The ISP is configured to process data fed back by the camera 130. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may also perform algorithm optimization on noise point, brightness, and skin tone of an image. The ISP may also optimize parameters such as exposure and color temperature of a photographed scene. In some embodiments, the ISP may be arranged in the camera 130.

The camera 130 is configured to capture a still image or video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 100 may include 1 or N cameras 130, and N is a positive integer greater than 1.

In some embodiments, the camera 130 may be set as a front camera of the electronic device, and is configured to capture a face image located before the display screen of the electronic device. It should be further noted that, the front camera can be understood as a camera capable of capturing images before the display screen during operation, and an installation location thereof is not limited.

In some embodiments, the camera 130 may have three working modes: an ambient light sensor (Ambient Light Sensor, ALS) mode, an ultra low power (Ultra Low Power, ULP) mode, and a normal mode.

The display screen is in the off-screen state, and the camera 130 may operate in the ALS mode to generate ultra-low resolution images at a configurable time interval. The camera 130 in the ALS mode monitors a light and shadow change based on image data of the ultra-low resolution images, and obtains a detection result of the light and shadow change. The camera 130 monitors the light and shadow change based on the image data of the ultra-low resolution images, and is configured to determine whether there is a light and shadow change before the camera.

If there is the light and shadow change before the camera, the camera may operate in the ULP mode to generate a low-resolution image. The low-resolution image is used for face detection.

When the camera is called to shoot, the camera runs in the normal mode.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send the electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some of the functional modules of the mobile communications module 150 may be disposed in a same device as at least some of modules of the processor 110.

The wireless communications module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components into which at least one communication processing module is integrated. The wireless communications module 160 receives an electromagnetic wave by using the antenna 2, performs frequency modulation on and filters the electromagnetic wave signal, and sends a processed signal to the processor 110. The wireless communications module 160 may further receive a to-be-sent signal from the processor 110, perform frequency modulation on and amplify the to-be-sent signal, and convert the to-be-sent signal into an electromagnetic wave by using the antenna 2 for radiation.

In the sensor module 170, the acceleration sensor 170A may detect acceleration values of the electronic device 100 in all directions (generally in three axes). When the electronic device 100 is stationary, a magnitude and a direction of a gravity may be detected. In some embodiments, the acceleration sensor 170A may be further configured to recognize a posture of the electronic device, and is applied to application such as switching between landscape orientation and portrait orientation, a pedometer, and off-screen display.

The proximity light sensor 170B may include, for example, a light-emitting diode (LED) and a photodetector, for example, the light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. In some embodiments, the detection result of the proximity light sensor 170B may be provided to the electronic device to determine whether to enable the face detection function.

The ambient light sensor 170C is configured to sense luminance of ambient light. The electronic device may adaptively adjust a luminance of the display screen 140 according to perceived brightness of the ambient light. The ambient light sensor 170C may be further configured to automatically adjust white balance during photo taking. In some embodiments, the detection result of the ambient light sensor 170C may be provided to the electronic device to determine whether to enable the face detection function.

In some embodiments, the acceleration sensor 170A, the proximity light sensor 170B, and the ambient light sensor 170C in the sensor module 170 may be in operation after the electronic device is powered on, and may also be triggered by an application program of the electronic device to start and run.

In addition, an operating system runs on the foregoing components, for example, an iOS operating system, an Android operating system, or a Windows operating system. An application program may be installed and run on the operating system.

Figure 2B:
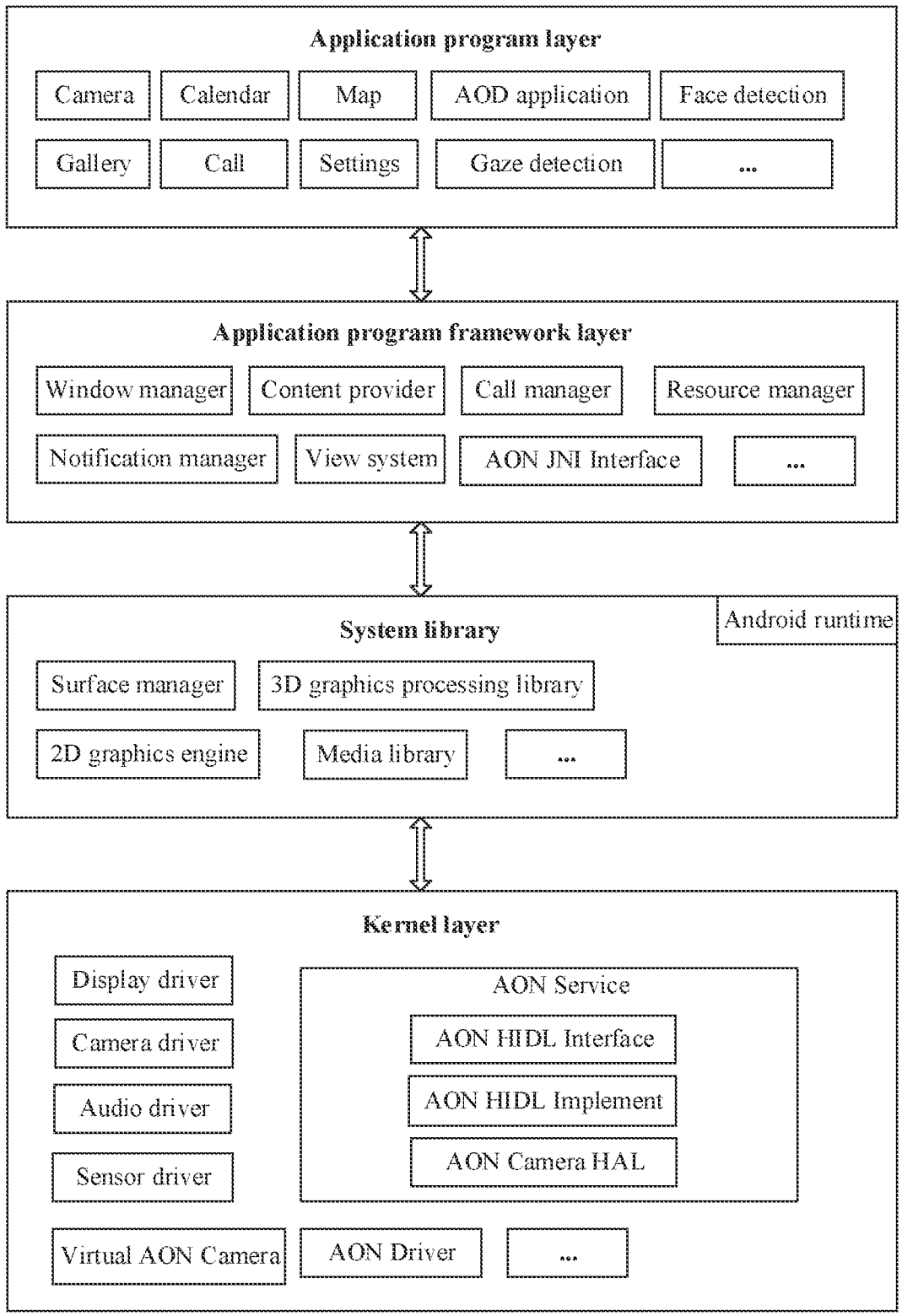
FIG. 2B is a diagram of a software architecture of an electronic device according to the present application.

FIG. 2B is a block diagram of a software structure of an electronic device according to an embodiment of the present application. In the hierarchical architecture, software is divided into several layers, and each layer has a clear role and task. The layers communicate with each other through a software interface. In some embodiments, the Android system is divided into four layers, which are an application program layer, an application program framework layer, an Android runtime (Android runtime) and system library, and a kernel layer from top to bottom.

The application program layer may include a series of application program packages. As shown in FIG. 2B, the application program package may include application programs such as camera, photo, calendar, call, map, setting (setting), AOD application, gaze detection, and face detection.

Figure 3A:
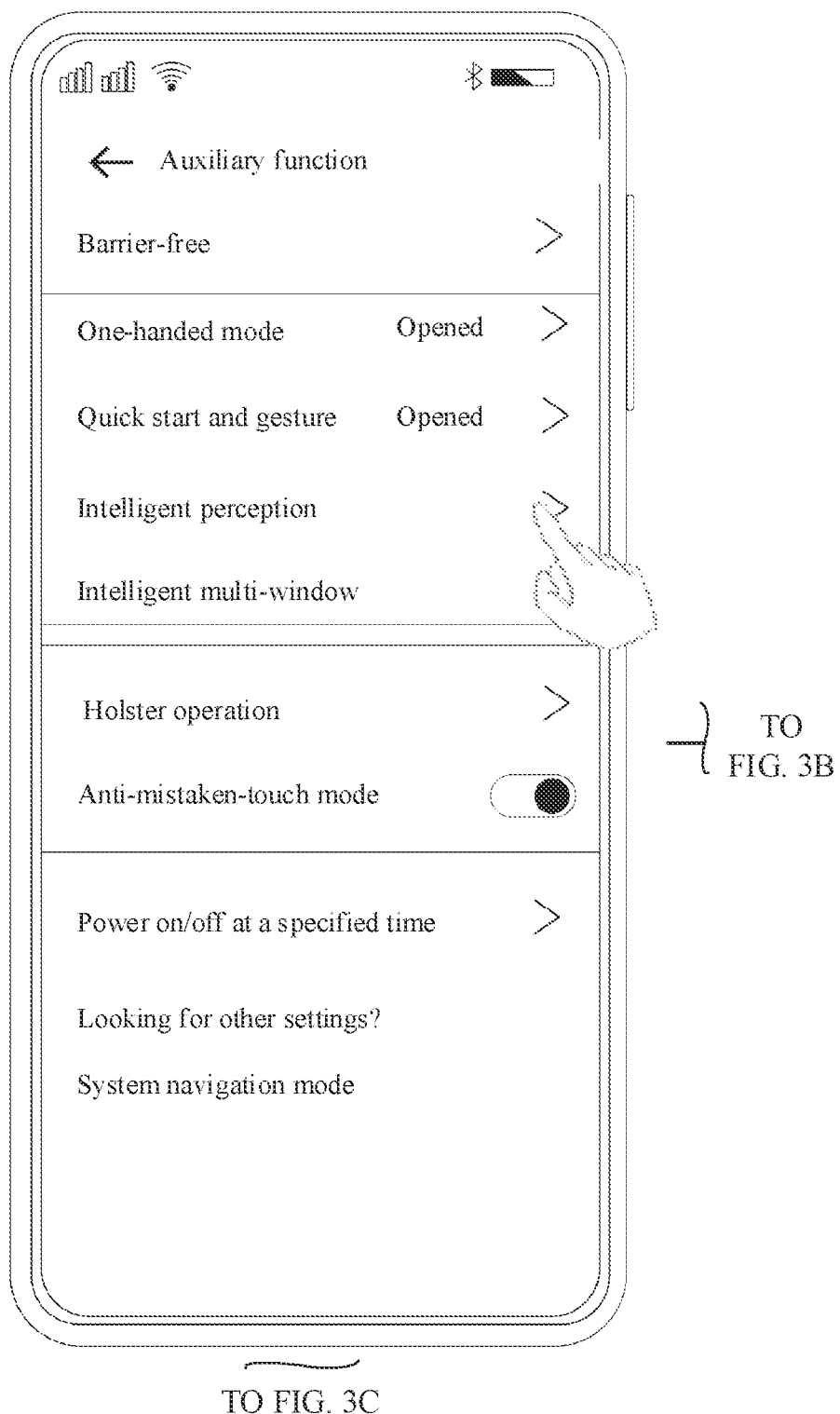
FIG. 3A to FIG. 3D are a display diagram of an interface of an electronic device according to the present application.
Figure 3B:
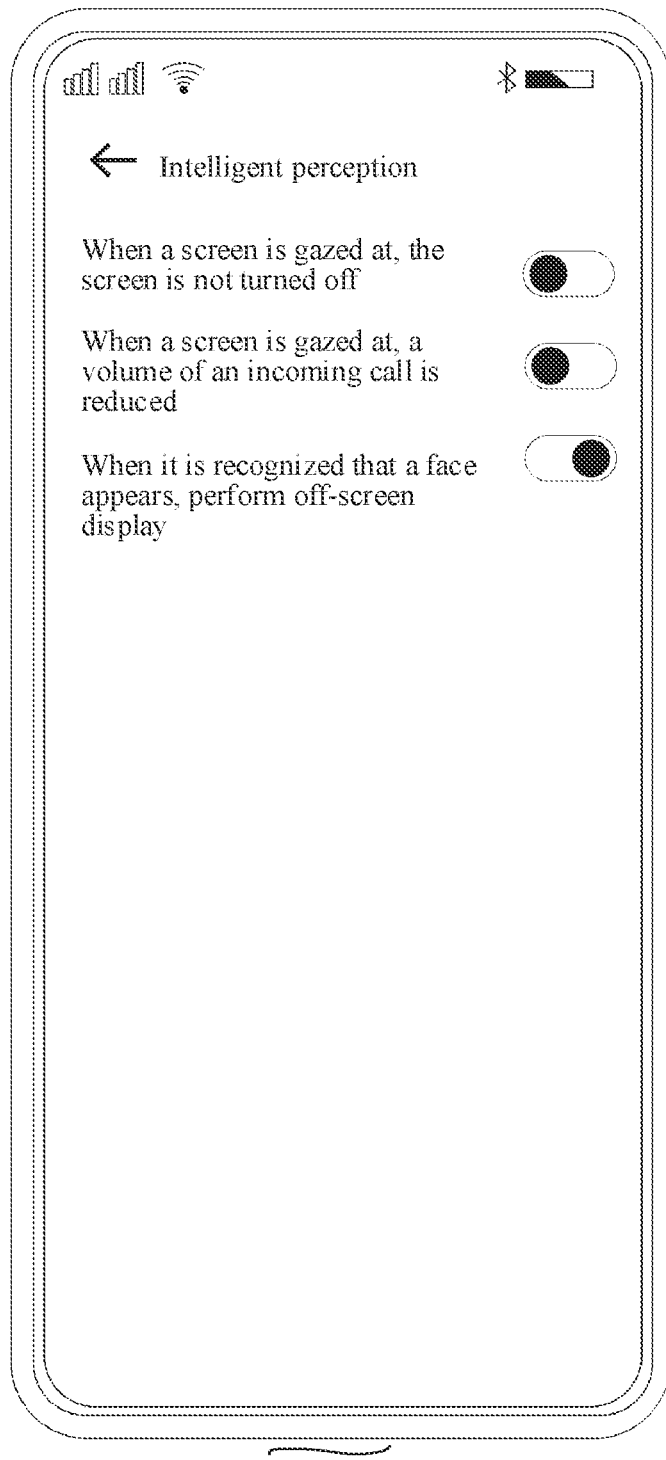

Setting is mainly responsible for product isolation and product information management. Setting stores attribute information of the electronic device. Setting may determine, according to the attribute information of the electronic device, whether the electronic device has a face detection capability. Setting determines an electronic device with a face detection capability and exposes a menu where the face detection function is enabled. "Intelligent perception" shown in FIG. 3A and "perform off-screen display when a face is recognized" shown in FIG. 3B are examples of the menus for enabling the face detection function.

The AOD application is configured to control displaying an off-screen display interface on the display screen.

Gaze detection is used to control whether a human eye is gazing at the display screen.

Face detection is used to trigger the function of detecting whether a face appears before the display screen.

In addition, when the face detection is enabled, the AOD application may have the function of controlling the display screen to display an off-screen display interface when a face appears before the display screen. Moreover, the AOD application may also control the display screen to display an off-screen display interface when it is determined that a face appears before the display screen.

In some embodiments, application programs such as the AOD application may initiate a registration process to the processor of the electronic device to start the proximity light sensor, the ambient light sensor, and the acceleration sensor, the proximity light sensor detects whether there is an object that approaches, the ambient light sensor detects the brightness of environment light, and the acceleration sensor detects the acceleration of the electronic device. The object that approaches can be understood as a person or a general object, and may also be replaced with an object.

The application program framework layer provides an application programming interface (application programming interface, API) and a programming framework for applications at the application program layer. The application program framework layer includes some predefined functions. As shown in FIG. 2B, the application program framework layer may include a window manager, a content provider, a call manager, a resource manager, a notification manager, a view system, an AON JNI interface, and the like.

The window manager is configured to manage a window program. The window manager may obtain a size of a display screen, determine whether there is a status bar, perform screen locking, take a screenshot of the screen, and the like.

The content provider is configured to store and obtain data and make the data accessible to an application program. The data may include a video, an image, audio, calls that are made and answered, a browsing history and a bookmark, a phonebook, and the like.

The call manager is configured to provide a communication function of the electronic device, for example, call state management (including connected and hang-up).

The resource manager provides various resources such as a localized character string, an icon, an image, a layout file, and a video file for an application program.

The notification manager enables an application to display notification information in the status bar that may be used to convey a message of a notification type, where the message may disappear automatically after a short stay without user interaction. For example, the notification manager is configured to provide a notification of download completion, a message notification, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flash.

The view system includes visual controls such as a control for displaying a text and a control for display an image. The view system may be configured to construct an application program. A display interface may include one or more views. For example, a display interface including a short message notification icon may include a view for displaying a text and a view for displaying a picture.

The AON JNI interface is configured to complete message transfer. When the AOD application has a request to enable/disable the off-screen display function, the AON JNI interface transparently transmits the request to an AON HIDL Interface of an AON service. When the AON HIDL interface reports a face detection event, the AON JNI interface transfers the face detection event to the AOD application.

Moreover, if the electronic device has a plurality of intelligent sensing functions, the AON JNI interface is further configured to perform cooperative scheduling of the plurality of intelligent sensing functions. In an example, the electronic device is configured with two intelligent perception functions of face detection and gaze detection. When gaze detection works, the AON JNI interface suspends face detection. When gaze detection is completed, the face detection function is performed.

In addition, if the electronic device relies on the upper system for control over some function switch, this is also placed in the AON JNI interface. For example, the electronic device has a sleep detection function, and the face detection function is disabled when a user sleeps. The trigger and exit of the sleep event are transferred through the AON JNI interface.

The AON JNI interface is further configured to provide function switch control for some upper-layer services. In an example, the electronic device has a sleep detection service, and running of the sleep detection process of the electronic device may perform the sleep detection function. When a sleep event is obtained in running of the sleep detection process of the electronic device, the AON JNI interface may transmit the sleep event to disable the face detection function.

The Android Runtime includes a core library and a virtual machine. The Android runtime is responsible for scheduling and managing the Android system. In some embodiments of the present application, cold start of an application may run in an Android runtime, the Android runtime obtains an optimized file state parameter of the application, and further the Android runtime may determine, by using the optimized file state parameter, whether the optimized file is out of date due to system upgrading, and return a determining result to an application control module.

The core library includes two parts: one part is a performance function that the Java language needs to invoke, and the other part is a core library of Android.

The application program layer and the application program framework layer run in the virtual machine. The virtual machine executes Java files of the application program layer and the application program framework layer as binary files. The virtual machine is used to execute functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL) and so on.

The surface manager is configured to manage a display subsystem, and provide fusion of 2D and 3D layers to a plurality of application programs.

The media library supports playback and recording in a plurality of common audio and video formats, and also support static image files, and the like. The media library may support a plurality of audio and video coding formats, such as: MPEG 2, H.262, MP3, AAC, AMR, JPG, and PNG.

The three-dimensional graphics processing library is used for implementing three-dimensional graphics drawing, image rendering, composition, layer processing, and the like.

The 2D graphics engine is a drawing engine for 2D drawings.

The kernel layer is a layer between hardware and software. The kernel layer includes at least a display driver, a camera driver, an audio driver, a sensor driver, an AON service, a virtual AON camera a virtual AON camera, an AON driver, and the like.

The camera driver may be configured to drive the camera 130 to run. In some embodiments, the camera driver controls the camera 130 to operate in the normal mode.

The sensor driver may be configured to drive the acceleration sensor 170A, the proximity light sensor 170B, and the ambient light sensor 170C to operate.

The AON service includes: AON HIDL interface, AON HIDL implement, and AON camera HAL. These three parts jointly form the control logic of the camera 130. The electronic device includes a plurality of cameras 130, and the AON camera HAL is used to complete the scheduling of the plurality of cameras 130. In addition, the control over switching between the three working modes of the camera 130 is also implemented by the AON camera HAL.

The virtual AON camera is configured to take over enabling/disabling of the face detection function after the AP becomes dormant. Specifically, the face detection function may be dynamically enabled/disabled according to the display state of the display screen, the posture of the electronic device, the detection result of the proximity light sensor, and the brightness of ambient light. The virtual AON camera is further configured to receive a face detection event, wake up the AP, and report a face detection event. When no face detection event is received, the AP is neither processed nor woken up.

The AON service is used to drive the AON module to run.

It should be noted that although this embodiment of the present application is described by using an Android system as an example, the basic principle is also applicable to an electronic device based on an operating system such as iOS or Windows.

It should be noted that in the embodiments of the present application, the electronic device may set a face recognition model. In some embodiments, the face recognition model may be invoked by the sensor hub. Usually, the FD module in the sensor hub invokes the face recognition model to perform face detection on the image data to obtain a face detection event. The face recognition model has the function of predicting whether the image data input to the face recognition model includes a face. The face recognition model may obtain a confidence level indicating whether the image data includes a face, and the electronic device may determine, based on the confidence level, whether the image data includes a face.

In some embodiments, the face recognition model may use basic network models such as a convolutional neural network (Convolutional Neural Network, CNN) and a long-short term memory (Long-Short Term Memory, LSTM) artificial neural network.

A convolutional neural network usually includes: an input layer, a convolution layer (Convolution Layer), a pooling layer (Pooling layer), a fully connected layer (Fully Connected Layer, FC), and an output layer. In general, the first layer of the convolutional neural network is the input layer, and the last layer of the convolutional neural network is the output layer.

The convolution Layer (Convolution Layer) is a neuron layer that performs convolution processing on an input signal in the convolutional neural network. In a convolutional layer of the convolutional neural network, a neuron may be connected to only some neurons of an adjacent layer. A convolutional layer usually includes several feature maps. Each feature map may include some neurons arranged in a rectangular shape. Neurons of the same feature map share a weight. The weight shared herein is a convolution kernel.

The pooling layer (Pooling layer), a feature with a larger dimension is usually obtained after the convolutional layer, the feature is cut into several regions in the pooling layer, and a maximum value or an average value thereof are obtained, to obtain a new feature with a smaller dimension.

A fully-connected layer (Fully-Connected layer) combines all local features into global features, and is configured to calculate a final score of each category.

The long-short term memory (Long-Short Term Memory, LSTM) artificial neural network usually includes an input layer, a hidden layer, and an output layer. The input layer includes at least one input node. When the LSTM network is a unidirectional network, the hidden layer only includes a forward hidden layer, and when the LSTM network is a bidirectional network, the hidden layer includes a forward hidden layer and a backward hidden layer. Each input node is connected to the forward hidden layer node and the backward hidden layer node, and is configured to output input data to the forward hidden layer node and the backward hidden layer node. The hidden node in each hidden layer is connected to the output node, and is configured to output a calculation result thereof to the output node, and the output node performs calculation according to the output result of the hidden layer and outputs data.

The face recognition model may be trained in the following manner:

An original face recognition model is built. Basic network models such as the CNN and the LSTM may be selected as the original face recognition model.

A large number of training samples are obtained, including: image samples including faces and image samples not including human faces, and whether the image samples include faces are marked for the training samples. In some embodiments, a face may refer to face key information, and the face key information may include at least one of image information indicating contours of eyes, a nose, and a mouth. Therefore, the image samples including faces may include image samples including complete faces and image samples including partial faces, such as image samples including side faces and image samples including occluded faces.

The training samples are input into the original face recognition model, and the original face recognition model detects whether the training samples include faces to obtain a detection result.

Loss values of a detection result and a marking result of each training sample are calculated based on a loss function, to obtain a loss value of the model. In some embodiments, a loss function such as a cross-entropy loss function and a weighted loss function may be used to calculate the loss value, or a combination of a plurality of loss functions may be used to calculate a plurality of loss values.

It is determined whether the loss value of the model meets a model convergence condition.

In some embodiments, the model convergence condition may be that the loss value of the model is less than or equal to a preset loss threshold. That is, the loss value of the model may be compared with the loss threshold. If the loss value of the model is greater than the loss threshold, it may be determined that the loss value of the model does not meet the model convergence condition. Conversely, if the loss value of the model is less than or equal to the loss threshold, it may be determined that the model loss value meets the model convergence condition.

It should be noted that for a plurality of training samples, a corresponding loss value of the model may be calculated for each training sample. In this case, execution is performed only when the loss value of the model for each training sample meets the model convergence condition. Conversely, as long as a loss value of the model for a training sample does not meet the model convergence condition, a next step is performed.

If the loss value of the model meets the model convergence condition, it means that the model training ends. The trained model may be used in the off-screen display control method proposed in the embodiments of the present application, to detect whether the image data input to the model includes a face.

If the loss value of the model does not meet the model convergence condition, a parameter update value of the model is calculated according to the loss value of the model, and the original face recognition model is updated based on the parameter update value of the model. The training samples continue to be processed based on the updated model, to obtain a detection result, and the subsequent process continues to be executed until the loss value of the model meets the model convergence condition.

It should be further noted that in this embodiment of the present application, the electronic device may provide a display interface, and the "face detection" application related to the software framework of the electronic device in FIG. 2B may be set. FIG. 3A to FIG. 3D show an example of the display interface. In FIG. 3A, a display interface of an auxiliary function includes an "intelligent perception" application. The user may click on a control of the "intelligent perception" application, and the display interface of the "intelligent perception" application may be displayed on the display screen, specifically as shown in FIG. 3B. The "intelligent perception" application shown in FIG. 3B includes three functional applications, that is, when gazing at the screen, skipping disabling the screen, when gazing at the screen, reducing a volume of an incoming call, and performing off-screen display when a face is recognized. Performing off-screen display when a face is recognized can be understood as the "face detection" function proposed in this embodiment of the present application. In the display interface of the "intelligent perception" application shown in FIG. 3B, the function of "performing off-screen display when a face is recognized" is enabled. Correspondingly, the display interface of the off-screen display application of the electronic device is adjusted.

Figure 3C:
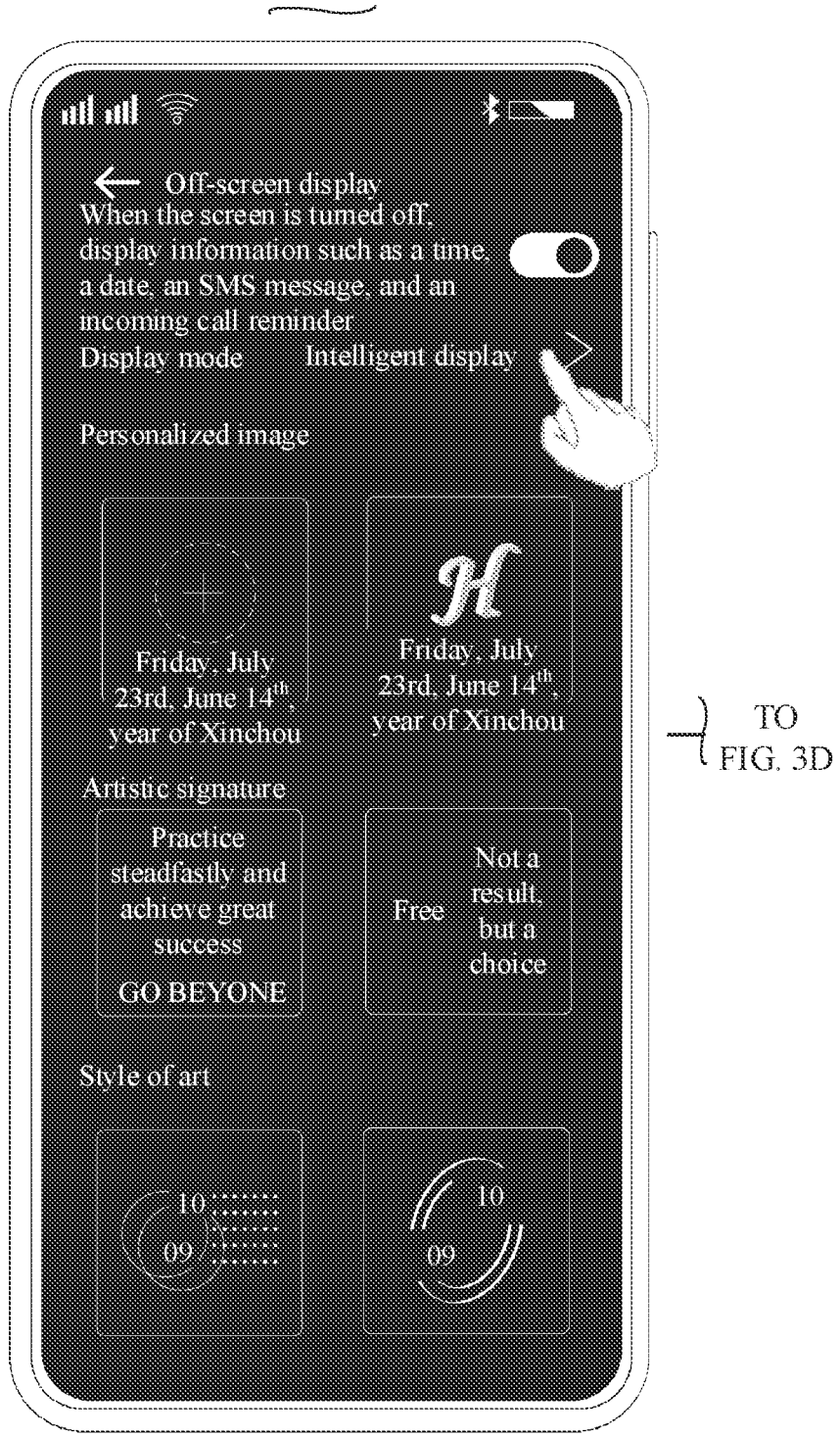
Figure 3D:
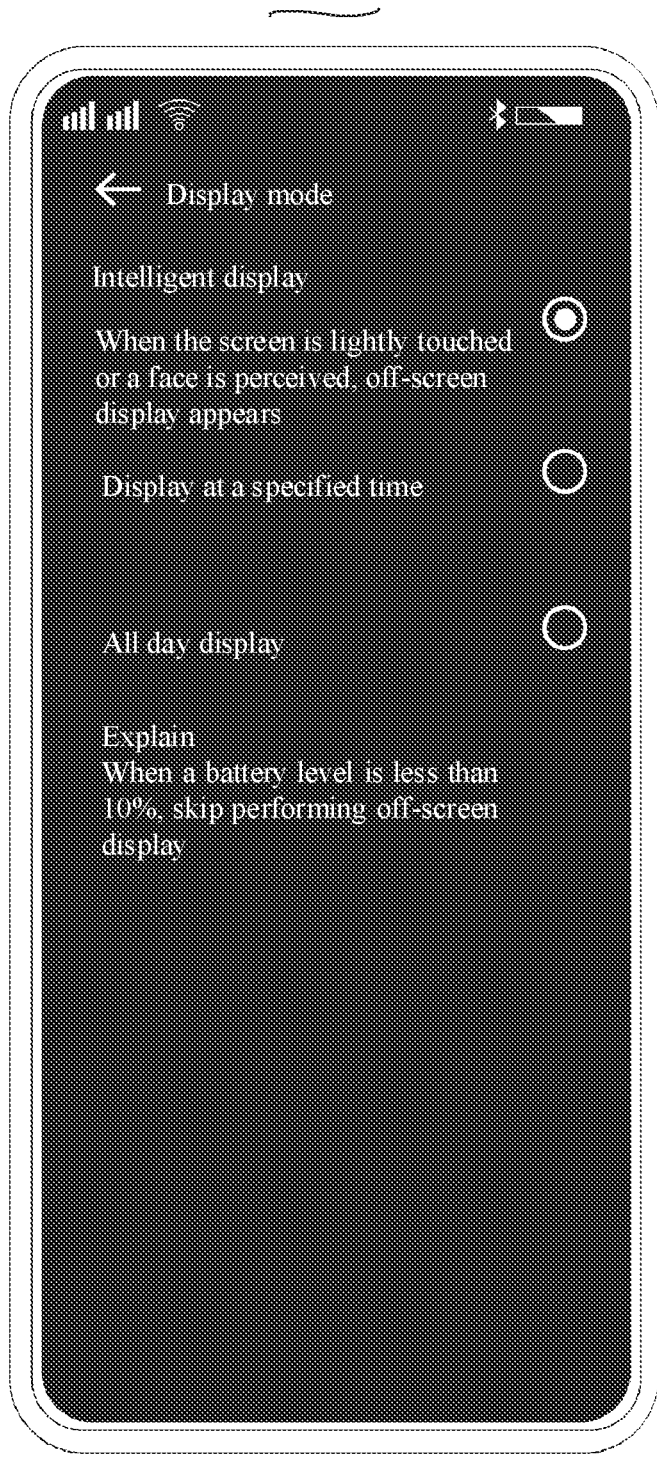

FIG. 3C shows an example of the display interface of the off-screen display application. In the display interface of the off-screen display application shown in FIG. 3C, the user may click on "display mode" to view a display mode of the off-screen display. When the function of "performing off-screen display when a face is recognized" is enabled, the display mode of the off-screen display is adjusted to the display mode of the intelligent display, as shown in FIG. 3D.

Figure 4A:
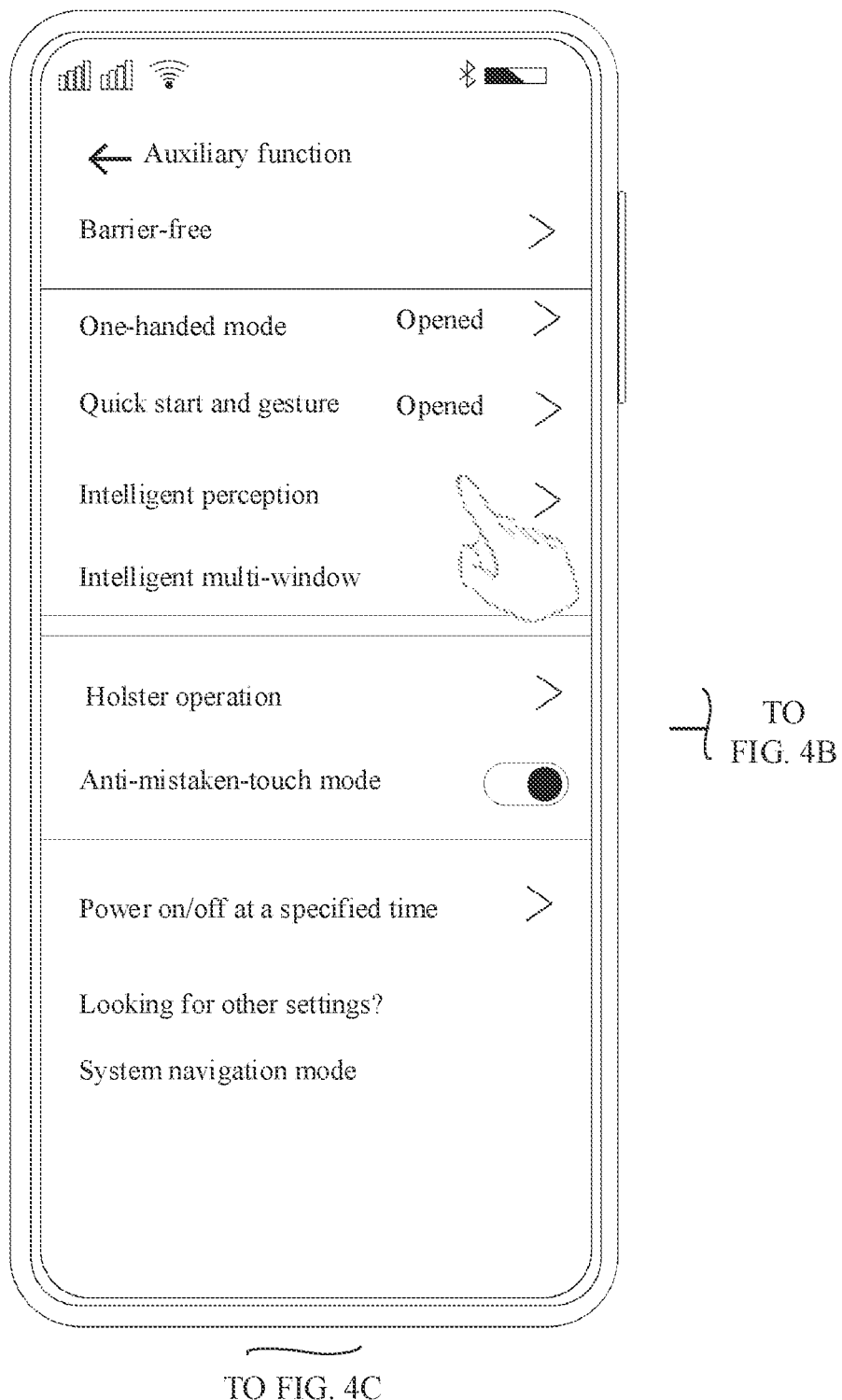
FIG. 4A to FIG. 4D are a display diagram of another interface of an electronic device according to the present application.
Figure 4B:
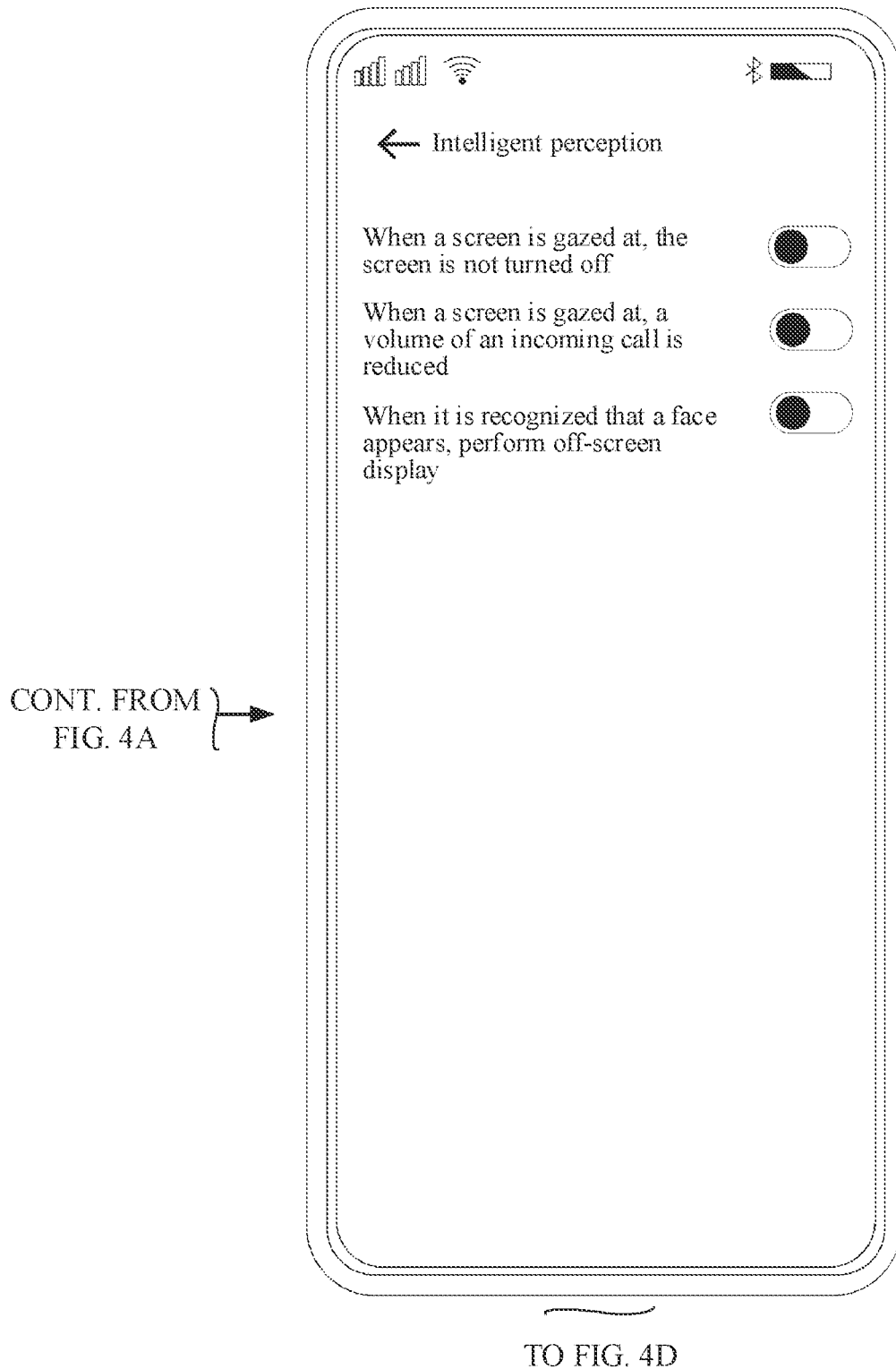
Figure 4C:
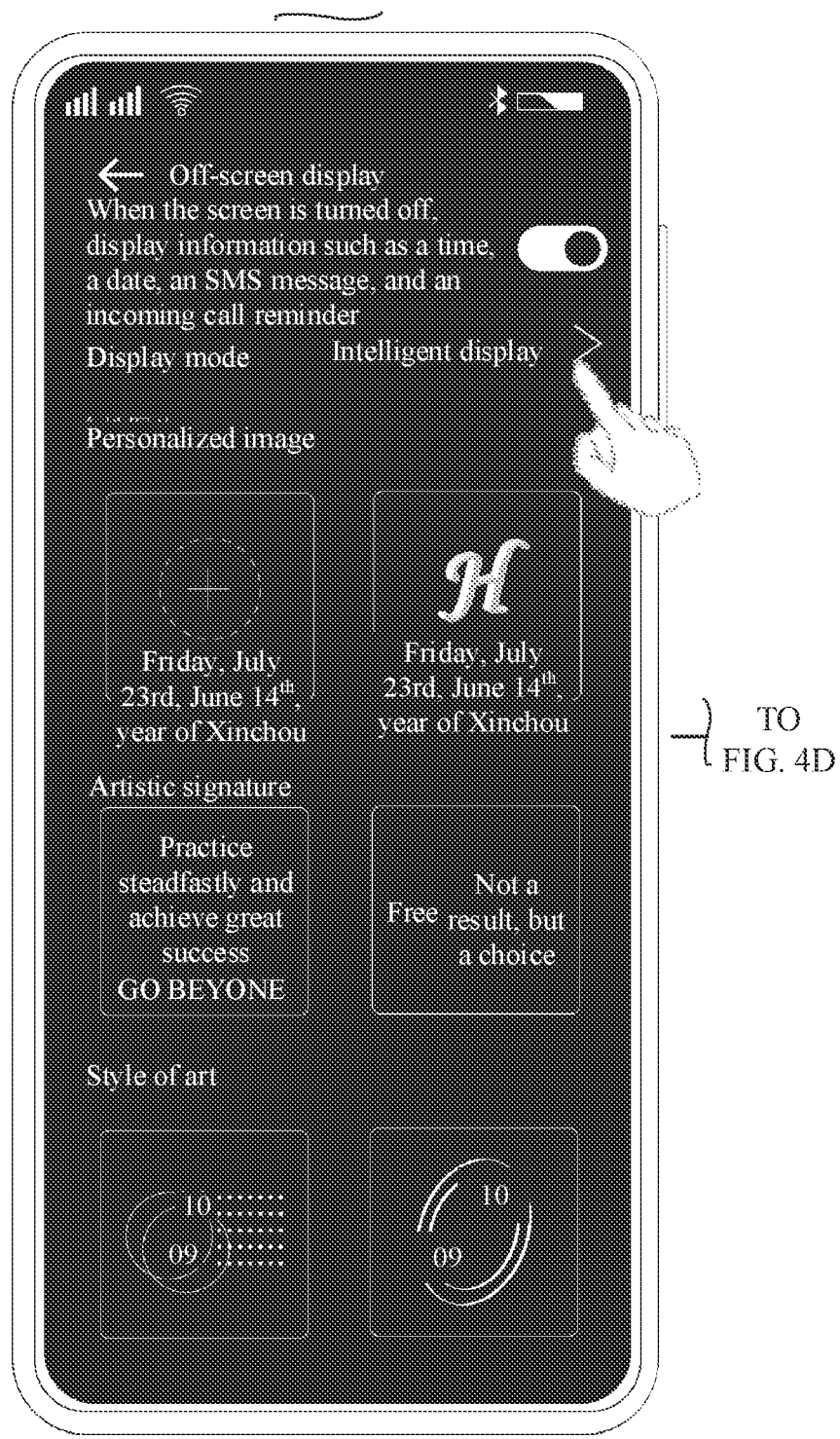
Figure 4D:
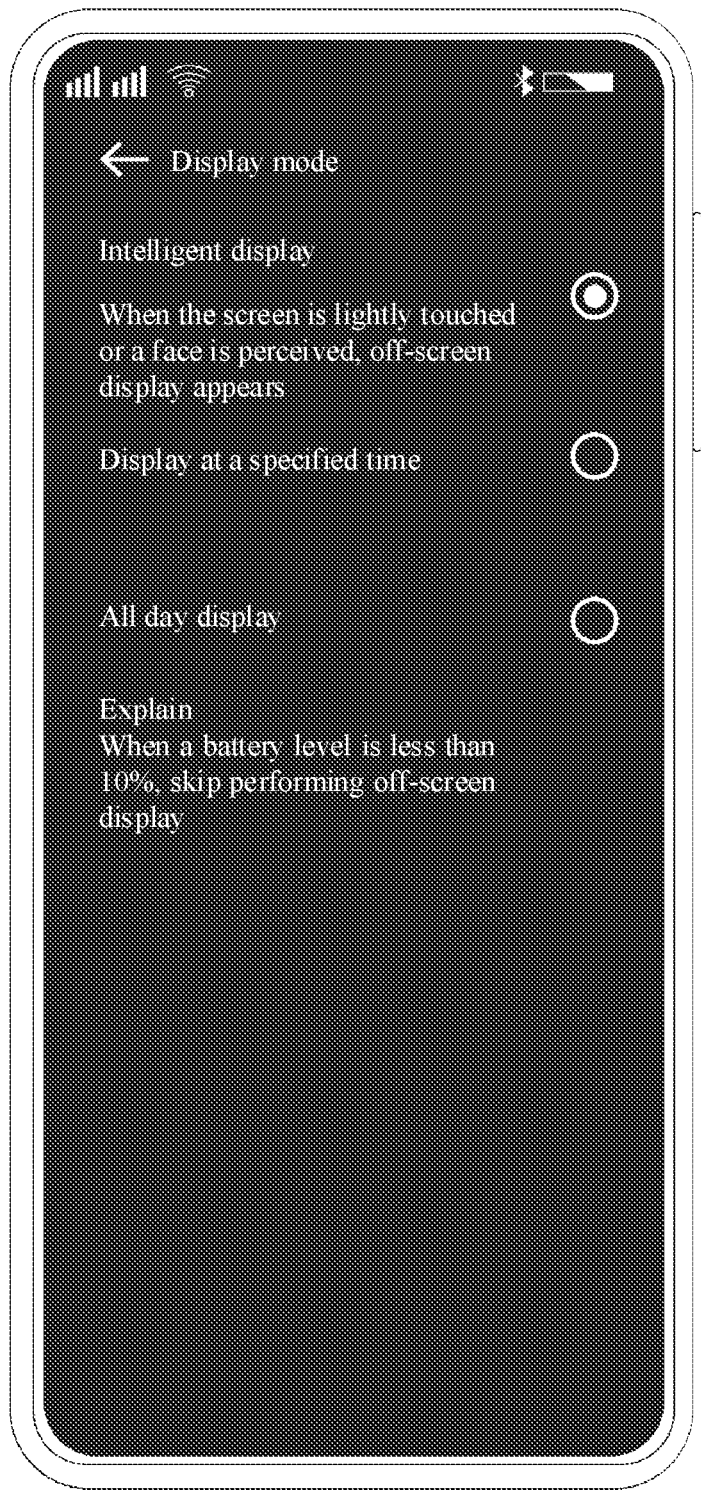

If the function of "performing off-screen display when a face is recognized" is disabled, the display mode of off-screen display changes. Refer to an interface example shown in FIG. 4A to FIG. 4D. Similarly, the user controls the display screen to display the display interface of the "intelligent perception" application by clicking on the control of the "intelligent perception" application shown in FIG. 4A. In the display interface of the "intelligent perception" application shown in FIG. 4B, the user clicks on a control of "performing off-screen display when a face is recognized" to disable this function. Correspondingly, the display mode of the off-screen display application is adjusted to touch display. As shown in FIG. 4C, the user clicks on the "display mode" of the display interface of the off-screen display application. As shown in FIG. 4D, the display mode of the off-screen display application is adjusted to touch display.

Embodiment 1

Figure 5B:
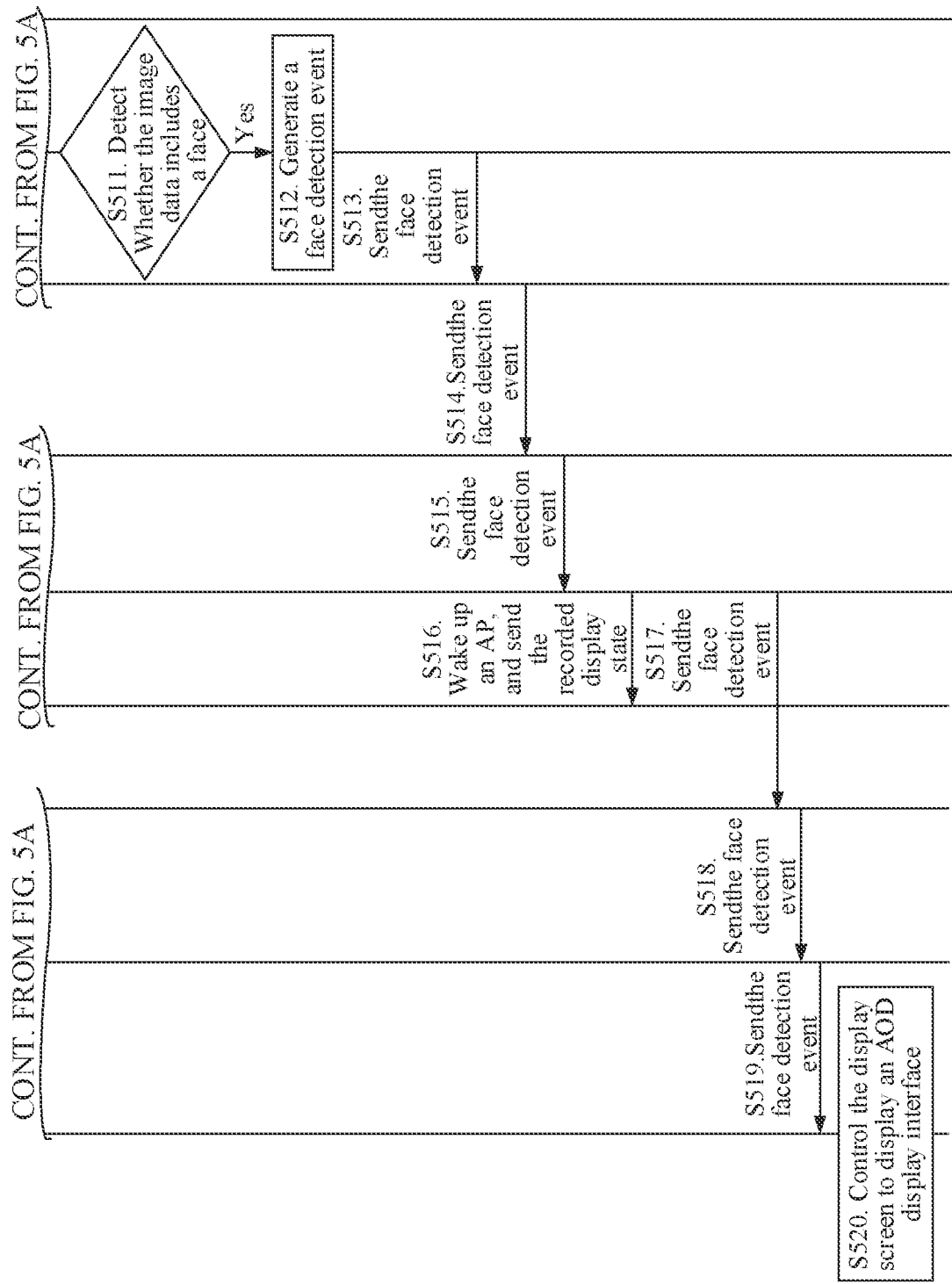

As shown in FIG. 3B, the function of "performing off-screen display when a face is recognized" of the electronic device is enabled, and the electronic device may implement that when the display screen is in the off-screen state, that a face appears before the display screen triggers the output of the off-screen display interface. To achieve this function, FIG. 5A and FIG. 5B show an off-screen display control method according to this embodiment. The off-screen display control method provided in this embodiment includes the following steps:

S501. An AOD application obtains a display state of a display screen.

Generally, the display state of the display screen includes: an on-screen state, an off-screen state, and a low power state (doze), where that the display screen of the electronic device displays a state of the AOD display interface can be understood as a low power state. The AOD application may obtain the display state of the display screen by monitoring an event broadcast by a display driver.

In some embodiments, the processor of the electronic device includes a power management module. The power management module can be understood as a logic unit, configured to monitor an on-screen request or an off-screen request sent by the application program or generated as triggered by the user, and use on-screen or off-screen logic to control the display driver to control the working state of the display screen.

Off-screen is used as an example, and off-screen triggering methods include: 1. The user manually presses the power button to turn off the screen. 2. The system performs automatic off-screen management, that is, the electronic device automatically turns off the screen if the user does not input an operation for a period of time. 3. Off-screen is actively initiated by the system, such as blocking in a call causes off-screen, and off-screen is delivered by the system in automatic restart.

The power management module determines that any one of the above-mentioned off-screen triggering methods is executed, and then sends an off-screen instruction to the display driver. The display driver powers off the display screen after receiving the off-screen instruction delivered by the power management module. At the same time, an off-screen event is broadcast, and the AOD application may monitor the off-screen event and determine that the display state of the display screen is the off-screen state.

Similarly, the AOD application may determine the on-screen state and the low power state in the same manner.

S502. The AOD application sends the display state of the display screen to an AON JNI interface.

As mentioned above in the software framework of the electronic device, the AON JNI interface belongs to the application program framework layer and is configured to complete message transfer. The AOD application sends the display state of the display screen to the AON JNI interface, so that the AON JNI interface transfers the display state of the display screen to a lower layer.

S503. The AON JNI interface receives the display state of the display screen, and sends the display state of the display screen to an AON service.

As mentioned above in the software framework of the electronic device, the AON service belongs to the kernel layer, and includes AON HIDL interface, AON HIDL implement, and AON camera HAL. The sending, by the AON JNI interface, the display state of the display screen to an AON service includes: sending, by the AON JNI interface, the display state of the display to the AON HIDL interface.

The AON HIDL interface receives the display state of the display screen and sends the display state of the display screen to the AON HIDL implement. The AON HIDL implement receives the display state of the display screen and sends the display state of the display screen to the AON camera HAL.

S504. The AON service receives the display state of the display screen, and sends the display state of the display screen to the virtual AON camera.

The AON Camera HAL receives the display state of the display screen, and sends the display state of the display screen to a virtual AON camera.

It should be noted that the operation of the AON Service depends on the AP being in the wake-up state. If the AP is dormant, the AON Service cannot control the enabling/disabling of the face detection function. Based on this, the sensor hub includes the logic unit of virtual AON camera, configured to take over the enabling/disabling of the face detection function when the AP is dormant.

Because the virtual AON camera takes over the enabling/disabling of the face detection function, the virtual AON camera needs to know the display state of the display screen. Therefore, the AON service receives the display state of the display screen. If the state of the display screen is the off-screen state, considering that when the display screen is in the off-screen state, the AP becomes dormant, before the AP becomes dormant, the AON service sends the display state of the display to the virtual AON camera.

S505. The display screen is in the off-screen state, and the AP enters a dormant state.

The display screen is in the off-screen state, and the AP becomes dormant. In some embodiments, the AP may determine, by learning the off-screen instruction delivered by the power management module, that the display screen is turned off.

S506. The virtual AON camera records the display state of the display screen.

Before the AP becomes dormant, the virtual AON camera records the display state of the display screen, and after the AP wakes up, the virtual AON camera may send the display state of the display screen to the AP.

It should be further noted that when the display screen is in the off-screen state, the AOD application may initiate a registration request to request to enable the face detection function and request to receive a face detection event. When the display screen is in the non-off-screen state, the AOD application may initiate a de-registration request to request de-registration, that is, disable the face detection function and skip receiving a face detection event.

Based on this, in the foregoing step S501 to step S503, what the AOD application sends to the lower layer is an AOD registration message. What the virtual AON camera records is the AOD registration message.

S507. The virtual AON camera sends an instruction for enabling the face detection function to the AON driver.

When the display screen is in the off-screen state, the electronic device may enable the face detection function, so that after the face is detected, the electronic device displays the AOD display interface. The virtual AON camera determines, based on the display state of the display screen, that the display screen of the electronic device is in the off-screen state, and sends an instruction for enabling the face detection function to the AON driver.

The AON driver, as mentioned above in the software framework of the electronic device, belongs to the kernel layer and is configured to drive the operation of the AON module.

S508. The AON driver sends an instruction for enabling the face detection function to the AON module.

After the AON driver receives the instruction for enabling the face detection function, the AON driver may send the instruction to the AON module to control the AON module to enable the face detection function.

As mentioned above in the hardware structure of the electronic device, the AON module includes an AON_ISP and an FD module, and the FD module is configured to perform face detection on the image data output by the AON_ISP. The AON driver sends the instruction for enabling the face detection function to the AON module, to control the AON_ISP to output image data and control the operation of the FD module for face detection.

It should be noted that as shown in FIG. 3B, after the user manually enables the function of "performing off-screen display when a face is recognized" of the electronic device, the electronic device does not immediately detect whether the face appears before the display screen to trigger output of the off-screen display interface. When the electronic device determines that the display screen of the electronic device is in the off-screen state by performing step S501 to S507, the electronic device executes step S508 to enable the face detection function to detect that a face appears before the display screen and trigger the display of the off-screen display interface.

As can be seen, when the face appears before the display screen, the function of displaying the off-screen display interface is triggered. The electronic device is equipped with two enabling switches. One enabling switch is provided for manual triggering by the user, and is a functional switch of "performing off-screen display when a face is recognized" in FIG. 3B. The other enabling switch is an automatic enabling switch triggered by a condition, for example, the instruction for enabling the face detection function when the display screen of the electronic device is turned off in step S508. Only after the two enabling switches equipped on the electronic device are both activated, the electronic device may detect that a face appears before the display screen, and trigger the display of the off-screen display interface.

S509. The camera captures image data.

In some embodiments, the display screen enters the off-screen state, and the AON camera HAL drives the camera to run.

As mentioned above in the hardware structure of the electronic device, the camera includes three working modes. The camera operates in the ALS mode to obtain a detection result of a light and shadow change. The AON camera HAL uses the detection result of the light and shadow change to determine whether there is a light and shadow change before the camera. The AON camera HAL switches the camera to operate in the ULP mode. The camera operates in the ULP mode and captures images at a specified frame rate, such as 5 fps. After the camera captures a number of images, such as 3 frames of images, the camera may exit from the ULP mode, and the AON camera HAL switches the camera to operate in the ALS mode.

In some embodiments, the AON camera HAL is configured with control logic for switching the camera to operate in the ALS mode or the ULP mode. The AON camera HAL may control, according to the control logic, the camera to operate in the ALS mode or the ULP mode.

It should be noted that FIG. 5A and FIG. 5B show an example of an execution order of capturing the image data by the camera, and does not constitute a limitation on the execution order of step S509. In some embodiments, the camera may be started by the camera driver to capture image data after the display screen enters the off-screen state.

S510. The AON module obtains image data captured by the camera.

The image data obtained by capturing images by the camera is in the form of electrical signal. The AON_ISP obtains the electrical signal, converts the electrical signal into image data, and provides the image data to the FD module.

S511. The AON module detects whether the image data includes a face.

The FD module detects whether the image data includes a face. In some embodiments, the AON module invokes the face recognition model to process the image data, to obtain a confidence level indicating whether the image data includes a face.

It should be noted that the detecting, by the FD module, whether the image data includes a face can be understood as: detecting, by the FD module, whether the image data includes a part or the entire of a face, for example, whether the image data includes a part or the entire of face key information.

If the AON module detects that the image data includes a face, S512 is executed to generate a face detection event. If the AON module detects that the image data does not include a face, the display screen maintains the off-screen state.

If the FD module determines that the confidence is greater than the threshold, it means that the image data includes a face, and a face detection event is generated. The face detection event is used to indicate that the image captured by the camera includes a face, indicating that there is a face before the display screen of the electronic device. In some embodiments, the face detection event may be a high or low level.

It should be further noted that the camera captures a plurality of frames of images, and the FD module invokes the face recognition model to process image data of each frame of image to obtain a confidence level of each frame of image. When a confidence level of a frame of image is greater than the threshold, a face detection event is generated. Certainly, the FD module may also generate a face detection event after determining that the confidence level of each frame of image is greater than the threshold.

The camera captures a plurality of frames of images, and the FD module determines that the confidence level of each frame of image is greater than the threshold, and generates a face detection event. As can be seen, when the FD module determines that the image data within a period of time includes a part or the entire of a face, the FD module generates a face detection event.

It should be further noted that before the AON module detects that the image data includes a face, and the AON module generates the face detection event, the method may further include: detecting, by the AON module, that the image data includes a specified feature, where the specified feature is a pre-configured image feature. The electronic device may take pictures of the legitimate user of the electronic device, such as the owner of the electronic device, through the camera, and extract key features of the image, such as at least one of the image information of contours of the eyes, the nose, and the mouth. The extracted key feature of the image may be the specified feature.

Based on this, the AON module detects that the image data includes a face, and then recognizes whether the image data includes a pre-configured image feature. If the AON module recognizes that the image data includes a pre-configured image feature, a face detection event is generated. In this way, it can be ensured that the electronic device may be triggered to display the off-screen display interface through the display screen only when the legitimate user of the electronic device appears before the display screen of the electronic device.

S513. The AON module sends the face detection event to the signal processor.

The FD module sends the face detection event to the signal processor.

S514. The signal processor sends the face detection event to the AON driver.

The signal processor receives the face detection event and sends the face detection event to the AON driver.

S515. The AON driver sends a face detection event to the virtual AON camera.

The FD module obtains the face detection event, indicating that a face appears before the display screen of the electronic device. The display screen may be triggered to output the AOD display interface. Therefore, the AON driver receives the face detection event and sends the face detection event to the virtual AON camera.

S516. The virtual AON camera wakes up the AP, and sends the recorded display state of the display screen to the AP.

Because the operation of the AON service depends on the AP being in the wake-up state, the virtual AON camera needs to wake up the AP first before uploading the face detection event.

Because the display state of the display screen is recorded by the Virtual AON Camera when the AP is dormant, after the AP wakes up, the Virtual AON Camera sends the display state of the display screen recorded by itself to the AP.

S517. The virtual AON camera sends a face detection event to the AON service.

The AP is woken up, the virtual AON camera and the AON service may perform communication, and the virtual AON camera may send the face detection event to the AON service.

In some embodiments, as mentioned above in the software framework of the electronic device, the AON service includes AON HIDL interface, AON HIDL implement, and AON camera HAL. The virtual AON camera sends the face detection event to the AON camera HAL, the AON camera HAL sends the face detection event to the AON HIDL Implement, and the AON HIDL Implement sends the face detection event to the AON HIDL Interface.

S518. The AON service sends the face detection event to the AON JNI interface.

The AON HIDL Interface receives the face detection event and sends the face detection event to the AON JNI Interface.

S519. The AON JNI Interface sends the face detection event to the AOD application.

The AON JNI Interface receives the face detection event and sends the face detection event to the AOD application.

S520. The AOD application controls the display screen to display an AOD display interface.

The AOD application receives the face detection event, determines that a face appears before the display screen of the electronic device, and then controls the display screen to display the AOD display interface, so that the user may trigger the display screen of the electronic device to display the AOD display interface by placing the face before the display screen.

In some embodiments, after the AOD application controls the display screen to display the AOD display interface for a period of time, such as 5 seconds, the display screen may exit from displaying the AOD display interface and enter the off-screen state.

Embodiment 2

The off-screen display control method provided in Embodiment 1 may implement the function of displaying an AOD display interface on the display screen when a face appears before the display screen when the display screen of the electronic device is in the off-screen state. When this function is performed, the face detection function of the electronic device is enabled. When the electronic device does not need to enable the face detection function, the face detection function of the electronic device may be disabled. The off-screen display control method provided in this embodiment may disable the face detection function.

Figure 6:
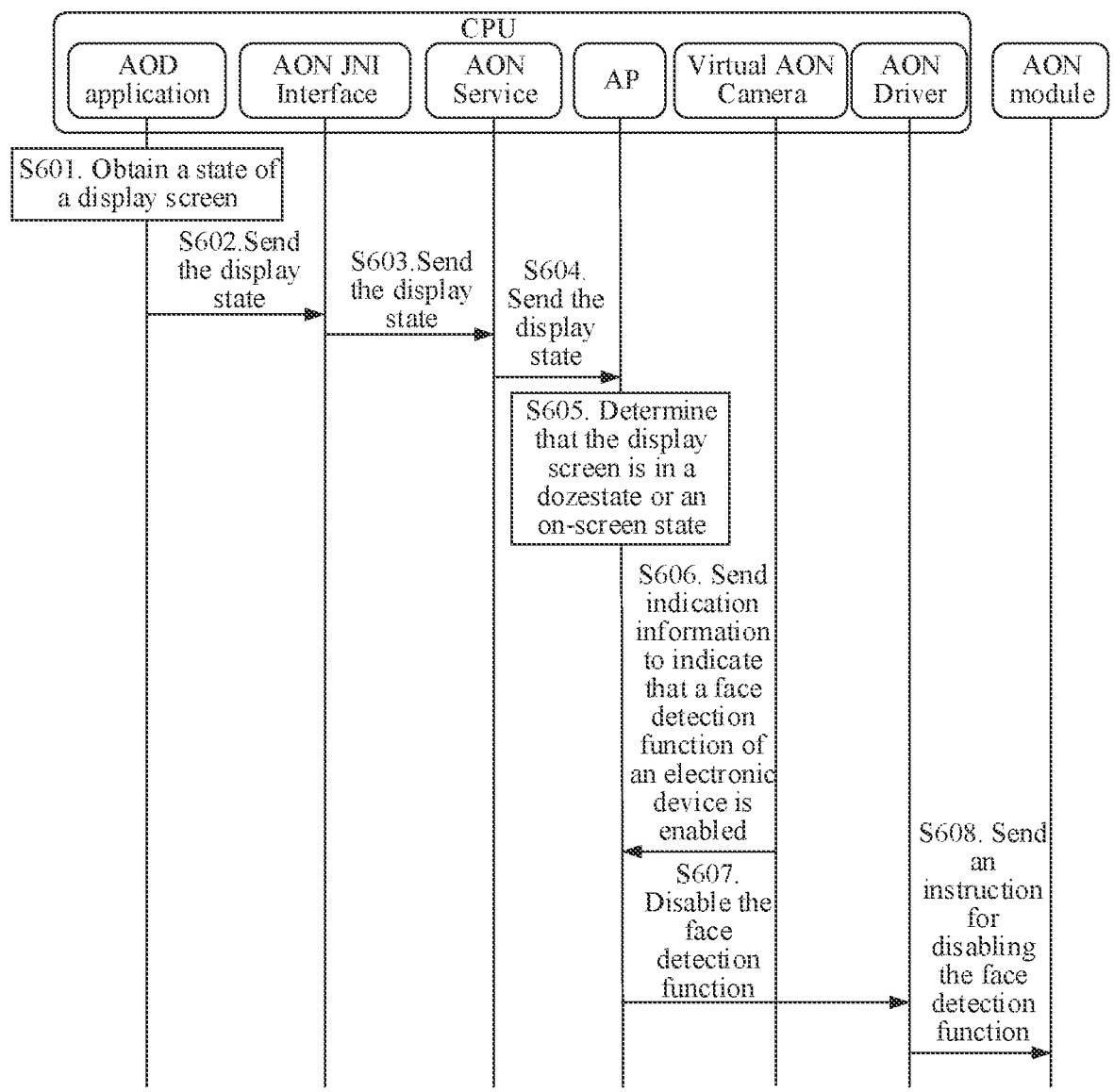
FIG. 6 is a signaling diagram of an off-screen display control method according to Embodiment 2 of the present application.

FIG. 6 shows an off-screen display control method according to an embodiment of the present application. The off-screen display control method provided in this embodiment includes the following steps:

S601. An AOD application obtains a display state of a display screen.

S602. The AOD application sends the display state of the display screen to an AON JNI interface.

S603. The AON JNI interface receives the display state of the display screen, and sends the display state of the display screen to an AON service.

S604. The AON service receives the display state of the display screen, and sends the display state of the display screen to an AP.

The specific implementation methods of steps S601 to S604 may be found in steps S501 to S504 of Embodiment 1, and will not be repeated herein.

S605. The AP determines that the display screen is in an on-screen state or a doze state.

The AP may determine whether the display screen is in an on-screen state or a doze state according to the received display state.

S606. The Virtual AON Camera sends indication information to the AP to indicate that the face detection function of the electronic device is enabled.

If the face detection function of the electronic device is enabled when the display screen is in the on-screen state or the doze state, this affects the normal usage of the electronic device. Therefore, the face detection function needs to be disabled. In order to disable the face detection function, the AP needs to know whether the face detection function of the electronic device is enabled.

In some embodiments, the Virtual AON Camera may detect whether the face detection function of the electronic device is enabled. The Virtual AON Camera determines that the face detection function of the electronic device is enabled, and then sends indication information to the AP, where the indication information is used to represent that the face detection function of the electronic device is enabled.

In some other embodiments, the AP may also send an instruction to the Virtual AON Camera, so that after receiving the instruction, the Virtual AON Camera determines whether the face detection function of the electronic device is enabled, and sends indication information to the AP.

It should be further noted that FIG. 6 shows an example of the execution order of step S606, but step S606 is not limited to this execution order, and the Virtual AON Camera may execute step S606 at any time before step S605.

S607. The AP sends an instruction for disabling the face detection function to the AON Driver.

The AP determines that the display screen is in the on-screen state or the doze state, and receives the indication information sent by the Virtual AON Camera, to determine that the face detection function of the electronic device is enabled, and then sends an instruction for disabling the face detection function to the AON Driver to instruct to disable the face detection function.

It should be further noted that both the on-screen state and the doze state are the non-off-screen state of the display screen, but the non-off-screen state of the display screen is not limited to the on-screen state and the doze state. When the display screen is in the non-off-screen state, the AP receives the indication information sent by the Virtual AON Camera, where the indication information indicates that the face detection function of the electronic device is enabled, and then sends an instruction for disabling the face detection function to the AON Driver to instruct to disable the face detection function.

S608. The AON driver sends an instruction for disabling the face detection function to the AON module.

The AON Driver receives an instruction for disabling the face detection function sent by the AON Driver, and sends the instruction for disabling the face detection function to the AON module.

The AO module receives the instruction and disables the face detection function. In some embodiments, the AON Driver sends the instruction for disabling the face detection function to the AON module, to control the FD module to disable face detection.

If the FD module disables face detection, it is not detected whether the image data captured by the camera includes a face, and no face detection event is reported. Based on this, the AOD application is not triggered by the face detection event to control the display screen to display the AOD display interface, so that the AOD display interface is not displayed when the display screen of the electronic device is in the non-off-screen state.

Embodiment 3

In step S507 of the off-screen display control method provided in Embodiment 1, that the Virtual AON Camera sends the instruction for enabling the face detection function to the AON Driver may be that when the Virtual AON Camera determines that the electronic device meets a condition, the Virtual AON Camera sends the instruction for enabling the face detection function to the AON Driver. In the off-screen display control method provided in this embodiment, this is described.

In this embodiment, according to implementation functions, the Virtual AON Camera may include: logic modules such as a display state processing module, an acceleration monitoring module, a proximity light monitoring module, an ambient light monitoring module, a posture detection module, a face detection start condition determining module, a face detection stop condition determining module, a face event reporting module, and an exception management module.

The display state processing module is responsible for receiving a display state instruction delivered by the upper layer, parsing a message, and recording a current display state. The display state processing module determines, according to the display state, a start or stop state of the face detection module, and sensor information of the electronic device, whether to enable or disable the face detection function.

The acceleration monitoring module is responsible for receiving acceleration change data sent by the acceleration sensor, and forwarding the acceleration change data to the posture monitoring module.

The proximity light monitoring module is responsible for receiving a proximity light change event sent by the proximity light sensor, and recording the proximity light (approaching or departing) event.

The ambient light monitoring module is responsible for receiving the ambient light brightness sent by the ambient light sensor and recording the ambient light brightness.

The posture detection module is responsible for receiving the data transmitted by the acceleration monitoring module, and identifying and recording the posture of the electronic device.

The face detection start condition determining module is responsible for enabling the face detection function according to a face detection start condition.

The face detection stop condition determining module is responsible for disabling the face detection function according to a face detection stop condition.

The face event reporting module is responsible for receiving a face detection event; and if a face is detected, waking up the AP and reporting the face detection event; and if a non-face is detected, performing no processing and returning to the face detection mode.

The exception management module is responsible for identifying process and functional exceptions and recording and reporting exceptions.

Figure 7A:
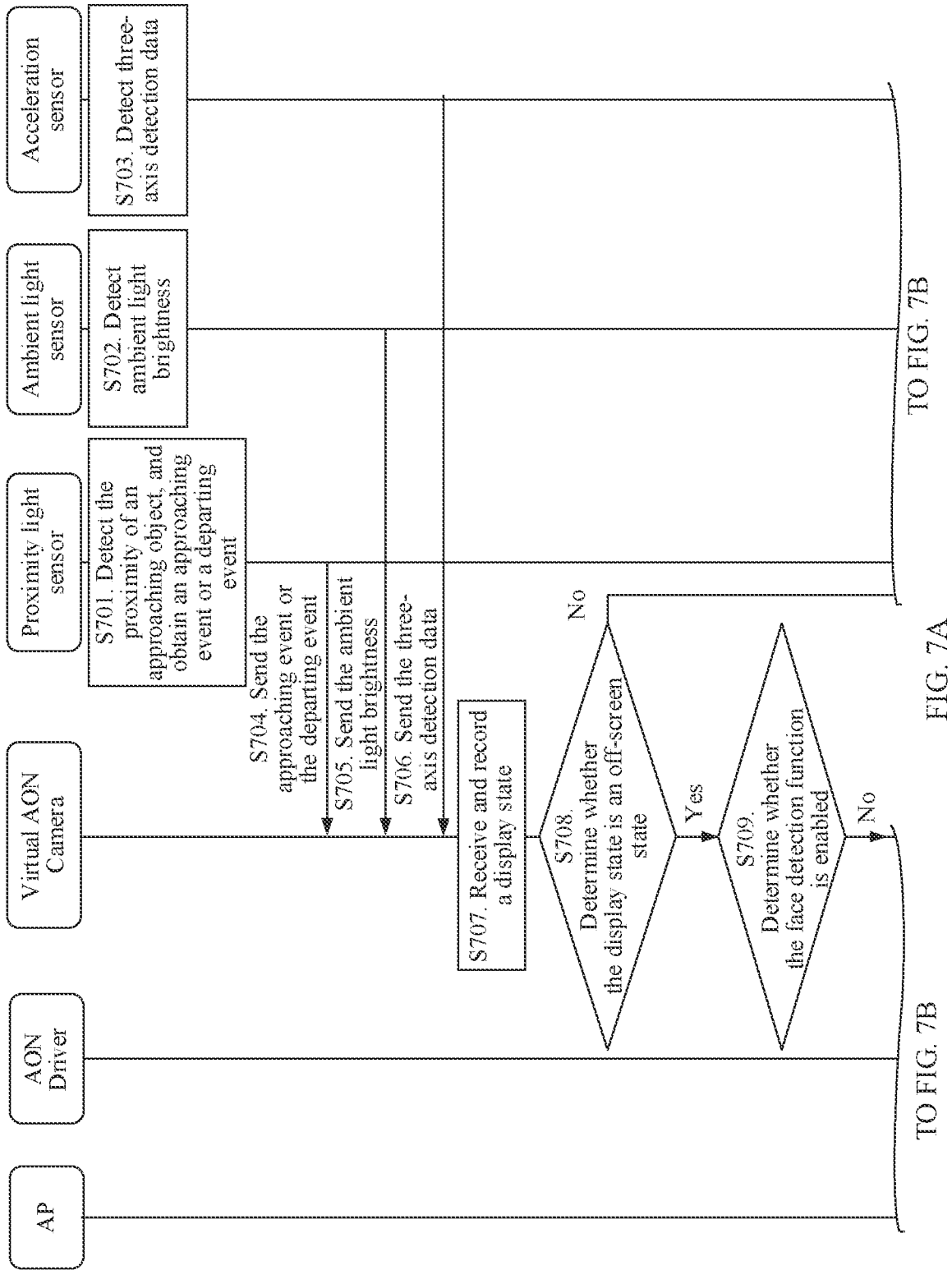

FIG. 7A and FIG. 7B show an off-screen display control method according to an embodiment of the present application. The off-screen display control method provided in this embodiment includes the following steps:

S701. The proximity light sensor detects the proximity of an object that approaches, and obtains an approaching event or a departing event.

The proximity light sensor detects that an object that approaches, and generates an approaching event. The proximity light sensor detects no object that approaches, and generates a departing event. In some embodiments, the approaching event and the departing event may be high and low levels. In an example, the high level refers to the approaching event, and the low level refers to the departing event.

S702: The ambient light sensor detects ambient light brightness.

The ambient light sensor is configured to detect ambient light in the environment where the electronic device is located and obtain the ambient light brightness.

S703. The acceleration sensor detects three-axis detection data.

The acceleration sensor detects accelerations of the electronic device in the three axes of x, y, and z, and obtains detection data of the three axes of x, y, and z.

S704. The proximity light sensor sends the approaching event or the departing event to the Virtual AON Camera.

The proximity light monitoring module receives the approaching event or the departing event sent by the proximity light sensor.

S705. The ambient light sensor sends the ambient light brightness to the Virtual AON Camera.

The ambient light monitoring module receives the ambient light brightness sent by the ambient light sensor.

S706. The acceleration sensor sends the three-axis detection data to the Virtual AON Camera.

The acceleration monitoring module receives the three-axis detection data sent by the acceleration sensor.

It should be further noted that FIG. 7A and FIG. 7B show an example of the execution order of steps S701 to S706, but steps S701 to S706 are not limited to this execution order. In some embodiments, the Virtual AON Camera may execute step S704, step S705, step S706, and step S707 in parallel.

S707. The virtual AON camera receives and records the display state of the display screen.

The Virtual AON Camera receives the display state of the display screen sent by the AON service. Sending the display state of the display screen by the AON service may be the same as the content of step S504 in Embodiment 1, which will not be repeated herein.

Specifically, the display state processing module receives and records the display state of the display screen.

It should be further noted that step S707 can be understood as step S506 in Embodiment 1. Certainly, before step S707 is executed, the electronic device needs to execute steps S501 to S505 of Embodiment 1, which will not be described in detail in this embodiment. Refer to the content of Embodiment.

S708. The Virtual AON Camera determines whether the display state is an off-screen state.

The display state processing module determines, based on the display state of the display screen, whether the display screen is in the off-screen state.

When the Virtual AON Camera determines that the display state is the off-screen state, step S709 to step S711 are performed. When the Virtual AON Camera determines that the display state is not the off-screen state, step S712 and step S713 are performed.

S709. The Virtual AON Camera determines whether the face detection function is enabled.

The display state processing module determines whether the face detection function is enabled.

It should be noted that FIG. 7A and FIG. 7B show an example of the execution order of step S707, step S708, and step S709, but step S707, step S708, and step S709 are not limited to the execution order. In some embodiments, the Virtual AON Camera may execute step S707 and step S709 in parallel, or execute step S709 first, and then execute step S707 and step S708.

Moreover, step S709 may also be an optional step. In some embodiments, the Virtual AON Camera determines that the display state is the off-screen state, and may directly execute step S710.

S710. The Virtual AON Camera determines, based on the three-axis detection data, whether the electronic device is not in a first posture, determines whether the ambient light brightness is not less than a first threshold, and determines whether to receive a departing event.

The first posture can be understood as a downward posture of the display screen of the electronic device, including a posture in which the display screen is completely downward and a posture in which the display screen is tilted downward at an angle.

The Virtual AON Camera may process three-axis detection data to obtain the posture of the electronic device. In some embodiments, the Virtual AON Camera may use the following formulas 1 to 3 to process the three-axis detection data to obtain a pitch angle g_pitch. The Virtual AON Camera determines whether the calculated pitch angle meets a threshold range, such as [110° to 350°]. If the calculated pitch angle is within the threshold range, it means that the electronic device is in the first posture. If the calculated pitch angle is not within the threshold range, it means that the electronic device is not in the first posture.

$$\text{acc\_data[PS\_DATA\_X]} = \text{ps\_gesture\_acc\_data.} x \times \text{SENSOR\_DATA\_FACTOR} \quad \text{Formula 1}$$

$$\text{acc\_data[PS\_DATA\_Y]} = \text{ps\_gesture\_acc\_data.} y \times \text{SENSOR\_DATA\_FACTOR} \quad \text{Formula 2}$$

$$\text{acc\_data[PS\_DATA\_Z]} = \text{ps\_gesture\_acc\_data.} z \times \text{SENSOR\_DATA\_FACTOR} \quad \text{Formula 3}$$

$$g\_pitch = \frac{\text{FLAT\_ANGLE}}{\text{PEI}} \times \text{atan} 2 \quad \text{Formula 4}$$
$$(-\text{acc\_data[PS\_DATA\_Y], acc\_data[PS\_DATA\_Z]})$$

In formula 1, ps_gesture_acc_data.x is detection data of the x-axis of the acceleration sensor.

In formula 2, ps_gesture_acc_data.y is detection data of the y-axis of the acceleration sensor.

In formula 3, ps_gesture_acc_data.z is detection data of the z-axis of the acceleration sensor.

In formula 1 to formula 3, SENSOR_DATA_FACTOR=100.

In formula 4, FLAT_ANGLE=180, and PEI=3.1415926.

The first threshold is an evaluation value of whether the ambient light brightness of the environment where the electronic device is located is sufficient to support the camera to capture a clear image. If the ambient light brightness is not less than the first threshold, it means that the ambient light brightness of the electronic device is sufficient to support the camera to capture a clear image. In an example, the first threshold may be 6 lux.

In some embodiments, the Virtual AON Camera may determine whether ambient light brightness reported by the ambient light sensor is not less than the first threshold.

In some other embodiments, the ambient light sensor may continuously detect the ambient light brightness to obtain a plurality of ambient light brightness, and report each ambient light brightness to the Virtual AON Camera. The Virtual AON Camera continuously determines whether each ambient light brightness is not less than the first threshold. In an example, the Virtual AON Camera determines whether five pieces of consecutive ambient light brightness are not less than the first threshold.

It should be noted that in this step, the face detection start condition determining module in the Virtual AON Camera may perform the step of determining, based on the three-axis detection data, whether the electronic device is in the first posture, determining whether the ambient light brightness is not less than the first threshold, and determining whether to receive a departing event.

The Virtual AON Camera determines, based on the three-axis detection data, that the electronic device is not in the first posture, determines that the ambient light brightness is not less than the first threshold, and determines that a departing event is received, and then executes S711. S711. The Virtual AON Camera enables the face detection function.

In some embodiments, the Virtual AON Camera determines, based on the three-axis detection data, that the pitch angle of the electronic device is not within the threshold range, such as [110° to 350°]; determines that a plurality of pieces of consecutive ambient light brightness (such as 5) are not less than the first threshold, such as 6 lux; and if determining that the departing event is received, enables the face detection function.

Specifically, the face detection start condition determining module enables the face detection function. In some embodiments, the virtual AON camera sends an instruction for enabling the face detection function to the AON driver.

It should be noted that step S711 can be understood as step S507 in Embodiment 1. Certainly, after step S711 is executed, the electronic device needs to execute steps S508 to S520 of Embodiment 1, which will not be described in detail in this embodiment. Refer to the content of Embodiment 1.

After the AON Driver receives the instruction for enabling the face detection function, the AON Driver may execute step S508 provided in Embodiment 1. In this way, the face detection function of the electronic device is enabled, and the AON module may obtain the image data captured by the camera, detect whether the image data includes a face, and generate a face detection event according to the face detection result.

As described in Embodiment 1, the Virtual AON Camera also receives the face detection event sent by the AON Driver, and executes steps S516 and S517. Step S516 and step S517 may be performed by the face event reporting module.

It should be noted that the Virtual AON Camera determines, based on the three-axis detection data of the acceleration sensor, that the electronic device is not in the first posture, and that the ambient light brightness is not less than the first threshold, and also determines that a departing event is received. This indicates that the display screen of the electronic device is in an upward posture and the brightness is sufficient in an environment, there is no object that approaches, and the face detection function may be enabled.

It should be further noted that if the Virtual AON Camera determines that at least one of the following three conditions is met, the face detection function is not enabled. The three conditions include: condition 1: determining, based on the three-axis detection data, that the electronic device is in the first posture: condition 2: determining that the ambient light brightness is less than the first threshold; and condition 3: determining that an approaching event is received.

If condition 1 is satisfied, it means that the display screen of the electronic device is in a downward posture and the user cannot see the display screen, such as a posture in which the display screen faces downwards. In this posture, even if the electronic device enables the face detection function and the display screen displays the AOD display interface, the interface cannot be seen by the user. Therefore, the face detection function may not be enabled to avoid wasting power.

If condition 2 is satisfied, it means that the brightness of the environment where the electronic device is located is excessively low, and even if the electronic device enables the face detection function, the image data captured by the camera is insufficient to identify whether a face is included. Therefore, the face detection function may also be disabled to avoid wasting power.

If condition 3 is satisfied, it means that there is an object that approaches the electronic device. For example, in a scenario where the electronic device is placed in a bag, the face detection function may also not be enabled to avoid wasting power.

It should be noted that in condition 2, that the ambient light brightness is less than the first threshold may refer to that a plurality of pieces of consecutive ambient light brightness include at least one ambient light brightness being smaller than the first threshold. In an example, five pieces of consecutive ambient light brightness are less than 6 lux. Certainly, condition 2 may also be determining that the ambient light brightness is smaller than other values smaller than the first threshold, such as 3 lux.

S712. The Virtual AON Camera determines whether the face detection function is enabled.

The display state processing module determines whether the face detection function is enabled.

It should be noted that the execution order of step S712 and step S708 is not limited to that shown in FIG. 7A and FIG. 7B. In some embodiments, step S712 may be performed first, and then step S708 may be performed.

If the Virtual AON Camera determines that the face detection function is enabled, S713 is performed. S713. The Virtual AON Camera sends indication information to the AP to indicate that the face detection function of the electronic device is enabled.

The Virtual AON Camera determines that the face detection function is enabled and the display screen is not in the off-screen state, and then sends indication information to the AP to indicate that the face detection function of the electronic device is enabled. It should be noted that Step S713 can be understood as step S606 in Embodiment 2. After the AP receives the indication information, the AP may execute step S607 provided in Embodiment 2, and the AON Driver executes step S608 provided in Embodiment 2.

It should be further noted that the face detection stop condition determining module of the Virtual AON Camera may execute step S713.

It should be further noted that during the operation process after the face detection function of the electronic device is enabled, the Virtual AON Camera may also determine, based on the detection data of the acceleration sensor, the proximity light sensor, and the ambient light sensor, whether to disable the face detection function.

The Virtual AON Camera may determine, based on the three-axis detection data of the acceleration sensor, whether the electronic device is in the first posture and whether the ambient light brightness detected by the ambient light sensor is less than the first threshold, or determine whether to receive the approaching event reported by the proximity light sensor.

The Virtual AON Camera determines, based on the three-axis detection data, that the electronic device is in the first posture, the ambient light brightness is less than the first threshold, or an approaching event is to be received, and then executes steps S712 and S713.

In some embodiments, the Virtual AON Camera calculates the pitch angle based on the three-axis detection data according to the formula provided in step S710. If it is determined that the calculated pitch angle is within the threshold range, such as [110° to 350°], it is determined that the electronic device is in the first attitude.

That the ambient light brightness is less than the first threshold may mean that ambient light brightness reported by the ambient light sensor is smaller than the first threshold, or may mean that a plurality of pieces of ambient light brightness reported by the ambient light sensor are all smaller than the first threshold. The first threshold may be the same as or different from the first threshold in step S710. In an example, five pieces of consecutive ambient light brightnesses are less than 3 lux.

If the electronic device is in the first posture when the face detection function of the electronic device is enabled, this means that the display screen of the electronic device faces downwards. This is a posture in which the user cannot see the display screen. In this posture, even if the electronic device enables the face detection function and the display screen displays the AOD display interface, the interface cannot be seen by the user. Therefore, the face detection function may be disabled to avoid wasting power.

If the ambient light brightness is less than the first threshold, it means that the brightness of the environment where the electronic device is located is excessively low, and even if the electronic device enables the face detection function, the image data captured by the camera is insufficient to identify whether a face is included. Therefore, the face detection function may be disabled to avoid wasting power.

When the Virtual AON Camera receives an approaching event, it means that there is an object that approaches the electronic device. For example, in a scenario where the electronic device is placed in a bag, the face detection function may also be disabled to avoid wasting power.

Embodiment 4

In the off-screen display control method provided in Embodiment 1, the electronic device may perform face detection when the display screen is in the off-screen state, and after a face is detected, the display screen displays an AOD display interface. However, during the execution of the off-screen display control method provided in Embodiment 1, there are the following application scenarios.

In this application scenario, the user is continuously before the display screen of the electronic device. The electronic device continuously determines that the face detection condition is met, causing the electronic device to be in an infinite cycle of "a face is detected→an AOD is displayed→AOD disappears after a period of time→a face is detected". Based on this, this embodiment provides an off-screen display control method, so as to prevent the electronic device from falling into the infinite cycle.

In this embodiment, the Virtual AON Camera may include a face continuous detection escape module. The face continuous detection escape module is configured to: determine that a difference between a reporting time of the face detection event and a reporting time of a previous face detection event is less than a second threshold, and skip reporting the face detection event, where the second threshold is 30 seconds or 1 minute. It should be noted that the second threshold is generally greater than the display duration of the AOD display interface.

Figure 8A:
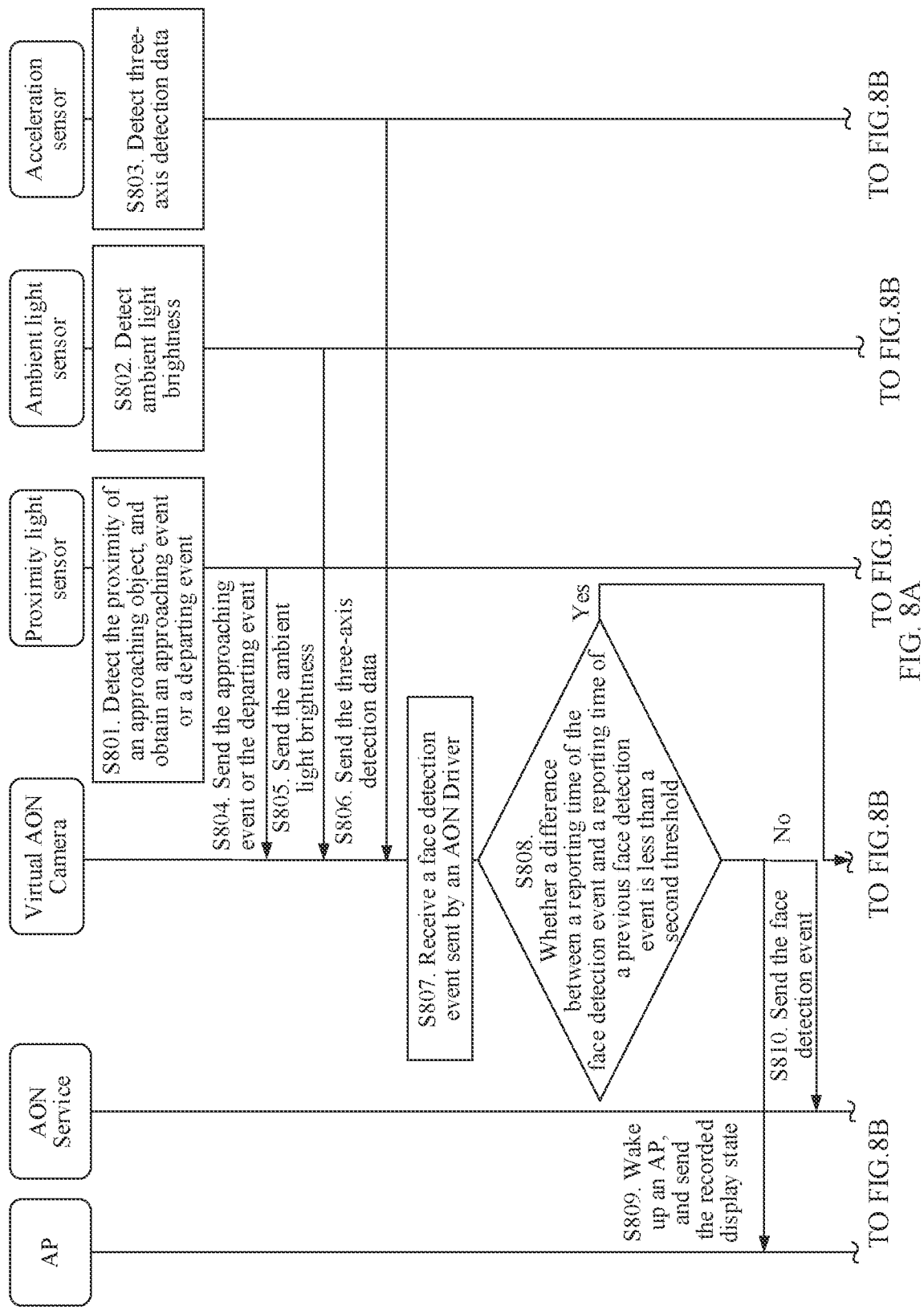
FIG. 8A and FIG. 8B are a signaling diagram of an off-screen display control method according to Embodiment 4 of the present application.
Figure 8B:
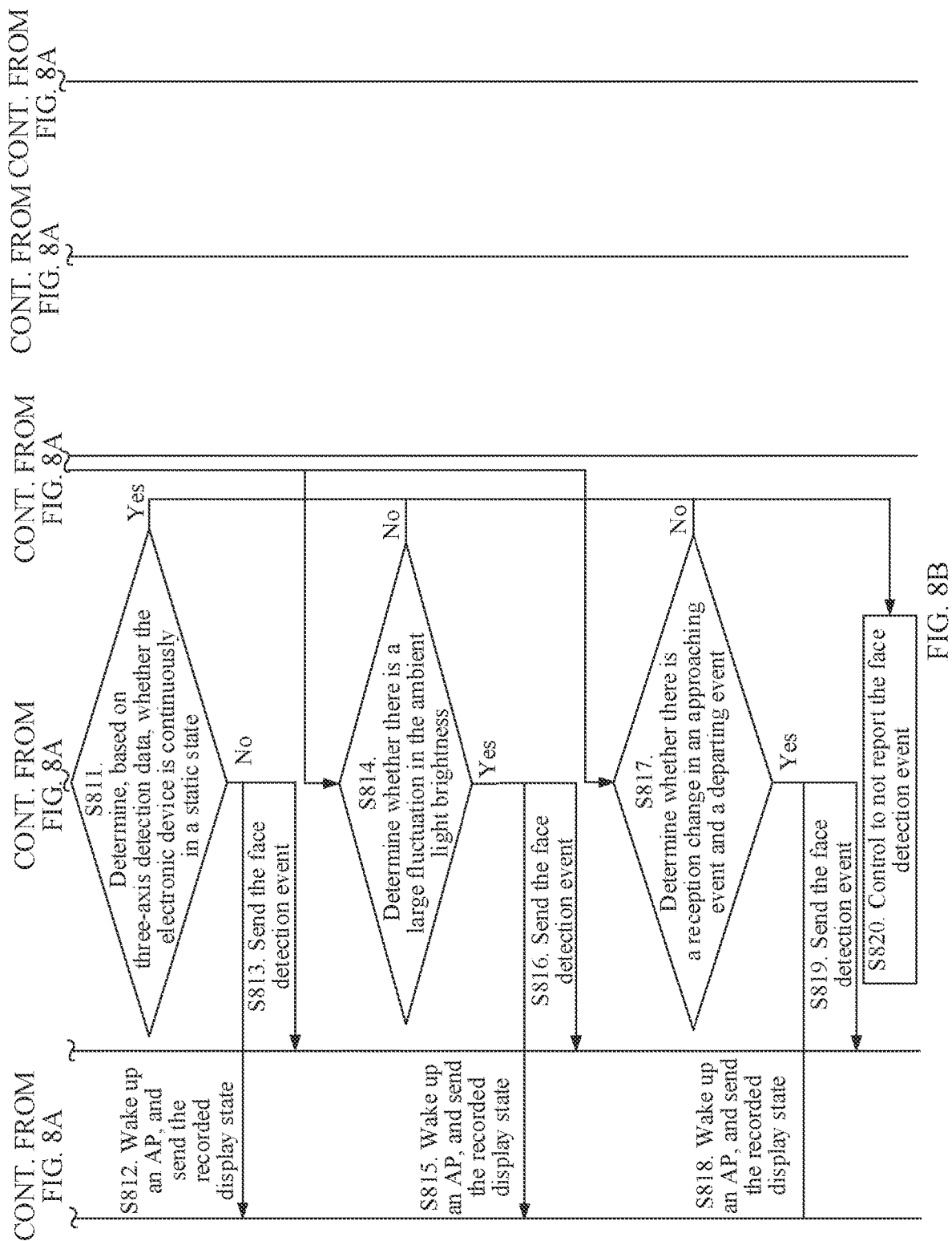

FIG. 8A and FIG. 8B show an off-screen display control method according to an embodiment of the present application. The off-screen display control method provided in this embodiment includes the following steps:

S801. A proximity light sensor detects the proximity of an object that approaches, to obtain an approaching event or a departing event.

S802. An ambient light sensor detects ambient light brightness.

S803. An acceleration sensor detects three-axis detection data.

S804. The proximity light sensor sends the approaching event or the departing event to the Virtual AON Camera.

S805. The ambient light sensor sends the ambient light brightness to the Virtual AON Camera.

S800. The acceleration sensor sends the three-axis detection data to the Virtual AON Camera.

It should be noted that the specific implementation processes of steps S801 to S806 may be found in steps S701 to S706 of Embodiment 3, and will not be repeated herein.

It should be further noted that FIG. 8A and FIG. 8B show an example of the execution order of steps S801 to S806, but steps S801 to S806 are not limited to this execution order. In some embodiments, the Virtual AON Camera may execute step S804, step S805, step S806, and step S807 in parallel.

S807. The virtual AON camera receives a face detection event sent by the AON Driver.

Step S807 can be understood as step S515 in Embodiment 1. As mentioned in the content of step S501 to step S514 of Embodiment 1, after the face detection function of the electronic device is enabled, the AON module generates a face detection event when detecting that image data includes a face, and uploads the face detection event to the Virtual AON Camera through the signal processor and the AON Driver.

In some embodiments, after the Virtual AON Camera receives the face detection event sent by the AON Driver, the Virtual AON Camera may record the reporting time of the face detection event.

S808. The Virtual AON Camera determines whether the difference between the reporting time of the face detection event and the reporting time of the previous face detection event is smaller than a second threshold.

The Virtual AON Camera determines that the difference between the reporting time of the face detection event and the reporting time of the previous face detection event is not smaller than the second threshold, and executes steps S809 and S810. The Virtual AON Camera determines that the difference between the reporting time of the face detection event and the reporting time of the previous face detection event is smaller than the second threshold, and executes steps S811 and S820.

Specifically, the face continuous detection escape module determines whether the difference between the reporting time of the face detection event and the reporting time of the previous face detection event is less than the second threshold.

It should be further noted that as mentioned in content in step S512 in Embodiment 1, if the AON module detects that the image data includes a face, the AON module may generate a face detection event and report the face detection event to the signal processor. In some embodiments, the AON module may also obtain the reporting time of the face detection event, and report the reporting time to the signal processor synchronously, and the AON Driver sends the reporting time to the Virtual AON Camera, so that the Virtual AON Camera may obtain the reporting time of the face detection event.

In some other embodiments, when the Virtual AON Camera receives the face detection event sent by the AON Driver, the Virtual AON Camera may also use the receiving time as the reporting time of the face detection event.

S809. The Virtual AON Camera wakes up the AP, and sends the recorded display state to the AP.

S810. The virtual AON camera sends a face detection event to the AON service.

The specific implementation processes of steps S809 and S810 may be found in steps S516 and S517 of Embodiment 1, and will not be repeated herein. Moreover, after step S809 and step S810 are executed, the electronic device may continue to execute step S518 to step S520 as proposed in Embodiment 1, which will not be described here. Refer to the content of Embodiment.

It should be noted that the Virtual AON Camera receives the face detection event, and determines that the difference between the reporting time of the face detection event and the reporting time of the previous face detection event is not less than the second threshold, and then executes steps S809 and S810, and the AON service may receive the face detection event. The AON service may also send the face detection event to the upper layer, so that the AOD application may receive the face detection event and control the display screen to display the AOD display interface. In this way, the electronic device may be prevented from entering an infinite cycle of "a face is detected→an AOD is displayed→the AOD disappears after a period of time→a face is detected".

S811. The Virtual AON Camera determines, based on three-axis detection data, whether the electronic device is continuously in a static state.

That the electronic device is continuously in a static state can be understood as: in a period of time from the moment when the face detection function of the electronic device is enabled to the moment when the Virtual AON Camera determines by step S808 that the difference between the reporting time of the face detection event and the reporting time of the previous face detection event is less than the second threshold, whether the electronic device is in a same posture.

In some embodiments, the pitch angle of the electronic device may be calculated through the three-axis detection data, and it may be determined whether the calculated pitch angle maintains a stable value. Maintaining a stable value can be understood as: in a period of time from the moment when the face detection function of the electronic device is enabled to the moment when the Virtual AON Camera determines by step S808 that the difference between the reporting time of the face detection event and the reporting time of the previous face detection event is less than the second threshold, the acceleration sensor continuously reports the three-axis detection data, and the difference of the pitch angle calculated by the Virtual AON Camera based on the three-axis detection data reported each time is within a specific range, such as within 5°.

The Virtual AON Camera determines, based on three-axis detection data, that the electronic device is not continuously in a static state, and then executes steps S812 and S813. The Virtual AON Camera determines, based on three-axis detection data, that the electronic device is continuously in a static state, and then executes step S820.

S812. The Virtual AON Camera wakes up the AP, and sends the recorded display state to the AP.

S813. The virtual AON camera sends a face detection event to the AON service.

The specific implementation processes of steps S812 and S813 may be found in steps S516 to S517 of Embodiment 1, and will not be repeated herein. Moreover, after step S812 and step S813 are executed, the electronic device may continue to execute step S518 to step S520 as proposed in Embodiment 1, which will not be described here. Refer to the content of Embodiment.

It should be noted that the Virtual AON Camera determines, based on three-axis detection data, that the electronic device is not continuously in a static state, and then executes steps S812 and S813, and the AON service may receive the face detection event. The AON service may also send the face detection event to the upper layer, so that the AOD application may receive the face detection event and control the display screen to display the AOD display interface. In this way, even if it may be inferred, based on the small difference between the reporting times of the former and latter face detection events, that the user is continuously before the display screen, as long as the posture of the electronic device changes, the display screen is triggered to display the AOD display interface.

S814. The Virtual AON Camera determines whether there is a large fluctuation in the ambient light brightness.

The Virtual AON Camera determines that there is a large fluctuation in the ambient light brightness, and then executes steps S815 and S816. The Virtual AON Camera determines that there is no large fluctuation in the ambient light brightness, and then executes step S820.

It can be understood that step S814 and step S811 are executed in parallel.

That there is a large fluctuation in the ambient light brightness can be understood as: in a period of time from the moment when the face detection function of the electronic device is enabled to the moment when the Virtual AON Camera determines by step S808 that the difference between the reporting time of the face detection event and the reporting time of the previous face detection event is less than the second threshold, whether there is a large change in the ambient light brightness reported by the ambient light sensor. In some embodiments, if the ambient light brightness reported by the ambient light sensor changes by at least several times, it may be determined that there is a large fluctuation in the ambient light brightness.

S815. The Virtual AON Camera wakes up the AP, and sends the recorded display state to the AP.

S816. The virtual AON camera sends a face detection event to the AON service.

The specific implementation processes of steps S815 and S816 may be found in steps S516 and S517 of Embodiment 1, and will not be repeated herein. Moreover, after step S815 and step S816 are executed, the electronic device may continue to execute step S518 to step S520 as proposed in Embodiment 1, which will not be described here. Refer to the content of Embodiment.

It should be noted that the Virtual AON Camera determines that there is a large fluctuation in the ambient light brightness, and then executes steps S815 and S816, and the AON service may receive the face detection event. The AON service may also send the face detection event to the upper layer, so that the AOD application may receive the face detection event and control the display screen to display the AOD display interface. In this way, even if it may be inferred, based on the small difference between the reporting times of the former and latter face detection events, that the user is continuously before the display screen, as long as the brightness of the environment where the electronic device is located changes, the display screen may be triggered to display the AOD display interface.

S817. The Virtual AON Camera determines whether there is a reception change of an approaching event and a departing event.

The Virtual AON Camera determines that there is a reception change of the approaching event and the departing event, and then executes step S818 and step S819. The Virtual AON Camera determines that there is no reception change of the approaching event and the departing event, and then executes step S820.

It can be understood that step S817, step S814, and step S811 are executed in parallel.

The reception change of the approaching event and the departing event can be understood as: in a period of time from the moment when the face detection function of the electronic device is enabled to the moment when the Virtual AON Camera determines by step S808 that the difference between the reporting time of the face detection event and the reporting time of the previous face detection event is less than the second threshold, the proximity light sensor reports an approaching event and also reports a departing event.

S818. The Virtual AON Camera wakes up the AP, and sends the recorded display state to the AP.

S819. The virtual AON camera sends a face detection event to the AON service.

The specific implementation processes of steps S818 and S819 may be found in steps S516 and S517 of Embodiment 1, and will not be repeated herein. Moreover, after step S818 and step S819 are executed, the electronic device may continue to execute step S518 to step S520 as proposed in Embodiment 1, which will not be described here. Refer to the content of Embodiment.

It should be noted that the Virtual AON Camera determines that there is a reception change of the approaching event and the departing event, and then executes steps S818 and S819, and the AON service may receive the face detection event. The AON service may also send the face detection event to the upper layer, so that the AOD application may receive the face detection event and control the display screen to display the AOD display interface. In this way, even if it may be inferred, based on the small difference between the reporting time of the former and latter face detection events, that the user is continuously before the display screen, as long as an object approaches and departs from the electronic device, the display screen may be triggered to display the AOD display interface.

S820. The Virtual AON Camera controls to not report the face detection event.

The face continuous detection escape module performs the step of controlling to not report the face detection event.

It should be further noted that steps S811 to S819 may be optional steps. In some embodiments, the Virtual AON Camera executes step S808, that is, determines that the difference between the reporting time of the face detection event and the reporting time of the previous face detection event is less than the second threshold, and may directly execute step S820.

It should be further noted that when it is determined that the difference between the reporting time of this face detection event and the reporting time of the previous face detection event is less than the second threshold and the face detection event is not reported, if an operation of touching the display screen by a hand is detected, the display screen of the electronic device may display the AOD display interface.

Another embodiment of the present application provides a computer-readable storage medium. The computer-readable storage medium stores instructions, and the instructions, when executed on a computer or a processor, cause the computer or the processor to perform one or more steps of the above method.

The computer-readable storage medium may be a non-transitory computer-readable storage medium. For example, the non-temporary computer readable storage medium may be a ROM, a random access memory (RAM), a CD-ROM, a magnetic tape, a floppy disk, or an optical data storage device.

Another embodiment of the present application further provides a computer program product including instructions. When the computer program product is run on a computer or a processor, the computer or the processor is caused to perform one or more steps in any one of the above methods.

What is claimed is:

1. A method, comprising:
enabling a face detection function when a display screen of an electronic device is in an off-screen state and obtaining image data through a front camera;
displaying an off-screen display interface on the display screen of the electronic device when the image data comprises a part of or an entirety of a face image; and
maintaining the off-screen state on the display screen of the electronic device when the image data does not comprise a part of or the entirety of a face image.

2. The method of claim 1, wherein a processor of the electronic device comprises an intelligent sensor hub that comprises an always-on (AON) module, and wherein enabling the face detection function comprises starting the AON module to perform the face detection function.

3. The method of claim 2, wherein the image data comprising the part of or the entirety of the face image comprises the AON module obtaining a face detection event.

4. The method of claim 2, wherein the AON module comprises an image signal processor (ISP) and a face detection module, and wherein starting the AON module to perform the face detection function comprises:
controlling the ISP to output image data; and
controlling the face detection module to perform face detection on the image data.

5. The method of claim 1, wherein the electronic device comprises a virtual always-on (AON) camera, and wherein enabling the face detection function comprises enabling the face detection function when the virtual AON camera determines that the display screen is in the off-screen state.

6. The method of claim 5, wherein before enabling the face detection function when the virtual AON camera determines that the display screen is in the off-screen state, the method further comprises receiving, by the virtual AON camera, an off-screen state of the display screen and recording the off-screen state of the display screen.

7. The method of claim 5, wherein after enabling the face detection function when the virtual AON camera determines that the display screen is in the off-screen state, the method further comprises waking up an application processor of the electronic device when the virtual AON camera determines that the image data comprises a part of or the entirety of image data, and sending the off-screen state of the display screen to the application processor.

8. The method of claim 1, wherein after displaying the off-screen display interface, the method further comprises disabling the face detection function when the display screen is in a non-off-screen state.

9. The method of claim 8, wherein an application processor of the electronic device determines that the display screen is in the non-off-screen state.

10. The method of claim 9, wherein before disabling the face detection function, the method further comprises receiving, by the application processor, indication information a virtual always-on (AON) camera, wherein the indication information indicates that the face detection function is in an enabled state.

11. The method of claim 8, wherein disabling the face detection function when the electronic device determines that the display screen is in a non-off-screen state comprises controlling an always-on (AON) module of the electronic device to disable the face detection function when the display screen is in the non-off-screen state.

12. The method of claim 1, wherein the electronic device comprises an always-on display (AOD) application, and wherein the method further comprises controlling the display screen to display the off-screen display interface when the AOD application determines that the image data comprises a part of or the entirety of a face image.

13. The method of claim 1, wherein before enabling the face detection function, the method further comprises determining that a face is recognized and an off-screen display function is enabled.

14. The method of claim 1, wherein before displaying the off-screen display interface, the method further comprises determining that the image data comprises a specified feature that represents a face image of a legitimate user of the electronic device.

15. The method of claim 1, wherein the image data comprising the part of or the entirety of the face image comprises a plurality of frames of image data comprising the part of or the entirety of the face image, wherein the plurality of frames of image data are from a front camera of the electronic device within a preset time.

16. The method of claim 1, wherein before enabling the face detection function, the electronic device satisfies a preset condition that the display screen of the electronic device is not in a downward posture, a brightness of an environment of the electronic device is not less than a first threshold, and the electronic device detects no object that approaches.

17. The method of claim 1, wherein before displaying the off-screen display interface a difference between a time when it is currently recognized that the image data comprises the part of or the entirety of the face image and a time when it is previously recognized that the image data comprises the part of or the entirety of the face image is not less than a threshold.

18. The method of claim 17, wherein a face detection event is based on recognizing that the image data comprises the part of or the entirety of the face image, wherein the time when it is currently recognized that the image data comprises the part of or the entirety of the face image is a reporting time of the face detection event, and wherein the time when it is previously recognized that the image data comprises the part of or the entirety of the face image is a reporting time of a previous face detection event.

19. An electronic device, comprising:
one or more processors;
a display screen coupled to the one or more processors;
a front camera coupled to the one or more processors; and
one or more memories coupled to the one or more processors, wherein the memory is configured to store instructions that, when executed by the one or more processors, cause the electronic device to be configured to:
enable a face detection function when the display screen is in an off-screen state and obtain image data through the front camera;
display an off-screen display interface on the display screen when the image data comprises a part of or an entirety of a face image; and
maintain the off-screen state on the display screen when the image data does not comprise a part of or the entirety of a face image.

20. A non-transitory computer-readable storage medium that stores instructions that, when executed by a processor of an electronic device, cause the electronic device to be configured to:
enable a face detection function when a display screen of the electronic device is in an off-screen state and obtaining image data through a front camera;
display an off-screen display interface on the display screen when the image data comprises a part of or an entirety of a face image; and
maintain the off-screen state on the display screen when the image data does not comprise a part of or the entirety of a face image.

* * * * *